(12) United States Patent
Han et al.

(10) Patent No.: US 10,818,087 B2
(45) Date of Patent: Oct. 27, 2020

(54) SELECTIVE STREAMING OF IMMERSIVE VIDEO BASED ON FIELD-OF-VIEW PREDICTION

(71) Applicants: AT&T INTELLECTUAL PROPERTY I, L.P., Atlanta, GA (US); The Trustees of Indiana University, Bloomington, IN (US)

(72) Inventors: Bo Han, Bridgewater, NJ (US); Vijay Gopalakrishnan, Edison, NJ (US); Lusheng Ji, Randolph, NJ (US); Feng Qian, Bloomington, IN (US)

(73) Assignees: AT&T Intellectual Property I, L.P., Atlanta, GA (US); The Trustees of Indiana University, Bloomington, IN (US)

( * ) Notice: Subject to any disclaimer, the term of this patent is extended or adjusted under 35 U.S.C. 154(b) by 0 days.

(21) Appl. No.: 15/828,994

(22) Filed: Dec. 1, 2017

(65) Prior Publication Data

US 2019/0104324 A1 Apr. 4, 2019

Related U.S. Application Data

(60) Provisional application No. 62/566,781, filed on Oct. 2, 2017.

(51) Int. Cl.
*H04N 7/173* (2011.01)
*G06T 19/00* (2011.01)
(Continued)

(52) U.S. Cl.
CPC ............ *G06T 19/006* (2013.01); *G06F 3/013* (2013.01); *G06F 3/04815* (2013.01);
(Continued)

(58) Field of Classification Search
CPC ........... H04N 21/21805; H04N 21/234; H04N 21/816; H04N 21/44218; H04N 21/218
(Continued)

(56) References Cited

U.S. PATENT DOCUMENTS 2,685,068 A 7/1954 Goubau
2,852,753 A 9/1958 Walter et al.
(Continued)

FOREIGN PATENT DOCUMENTS

GB 2525170 A 10/2015
GB 2545999 7/2017
(Continued)

OTHER PUBLICATIONS

Akalin, Tahsin et al., "Single-Wire Transmission Lines at Terahertz Frequencies", IEEE Transactions on Microwave Theory and Techniques, vol. 54, No. 6, 2006, 2762-2767.
(Continued)

*Primary Examiner* — Jivka A Rabovianski
(74) *Attorney, Agent, or Firm* — Guntin & Gust, PLC; John G. Rauch

(57) ABSTRACT

Aspects of the subject disclosure may include, for example, a process that determines a field-of-view of an immersive video viewer, determines present orientation of the immersive video viewer at a first time, and predicts a future orientation of the immersive video viewer occurring at a second time based on the present orientation of the immersive video viewer. A subsegment of an entire immersive video frame corresponding to the second time is identified based on the predicted orientation of the immersive video viewer and the field-of-view. Wireless transmission of the subsegment of the entire immersive video frame to the immersive video viewer is facilitated for presentation at the immersive video viewer at the second time, without requir- (Continued)

ing transmission of the entire immersive video frame. Other embodiments are disclosed.

20 Claims, 11 Drawing Sheets

(51) Int. Cl.
| | |
|---|---|
| H04L 29/06 | (2006.01) |
| G06F 3/01 | (2006.01) |
| H04N 21/2343 | (2011.01) |
| H04N 19/597 | (2014.01) |
| G06F 3/0481 | (2013.01) |
| G06T 15/20 | (2011.01) |
| H04N 21/218 | (2011.01) |
| H04N 21/234 | (2011.01) |
| H04N 21/81 | (2011.01) |

(52) U.S. Cl.
CPC .............. *G06T 15/20* (2013.01); *H04L 67/38* (2013.01); *H04N 19/597* (2014.11); *H04N 21/21805* (2013.01); *H04N 21/234* (2013.01); *H04N 21/234345* (2013.01); *H04N 21/816* (2013.01)

(58) Field of Classification Search
USPC ............................................. 725/20, 38, 116
See application file for complete search history.

(56) References Cited

U.S. PATENT DOCUMENTS

| | | | |
|---|---|---|---|
| 2,921,277 | A | 1/1960 | Goubau |
| 5,889,449 | A | 3/1999 | Fiedziuszko |
| 6,239,377 | B1 | 5/2001 | Nishikawa et al. |
| 6,483,543 | B1 | 11/2002 | Zhang et al. |
| 6,993,074 | B2 | 1/2006 | Li et al. |
| 7,009,471 | B2 | 3/2006 | Elmore |
| 7,260,564 | B1 | 8/2007 | Lynn et al. |
| 7,567,154 | B2 | 7/2009 | Elmore |
| 7,590,404 | B1 | 9/2009 | Johnson et al. |
| 8,159,385 | B2 | 4/2012 | Farneth et al. |
| 8,212,635 | B2 | 7/2012 | Miller, II et al. |
| 8,253,516 | B2 | 8/2012 | Miller, II et al. |
| 8,269,583 | B2 | 9/2012 | Miller, II et al. |
| 8,344,829 | B2 | 1/2013 | Miller, II et al. |
| 8,681,859 | B2 | 3/2014 | Washington et al. |
| 9,342,917 | B2 | 5/2016 | Chavez et al. |
| 9,429,752 | B2 | 8/2016 | Schowengerdt et al. |
| 9,690,099 | B2 | 6/2017 | Bar-Zeev et al. |
| 9,721,393 | B1 | 8/2017 | Ben-Zacharia et al. |
| 9,754,167 | B1 | 9/2017 | Gordon et al. |
| 10,313,745 | B2 | 6/2019 | Lederer et al. |
| 10,523,980 | B2 | 12/2019 | Galpin et al. |
| 2003/0040820 | A1 | 2/2003 | Staver et al. |
| 2004/0113756 | A1 | 6/2004 | Mollenkopf et al. |
| 2004/0146102 | A1 | 7/2004 | Okawa et al. |
| 2005/0053136 | A1 | 3/2005 | Yu et al. |
| 2005/0062869 | A1 | 3/2005 | Zimmermann et al. |
| 2005/0258920 | A1 | 11/2005 | Elmore et al. |
| 2008/0008458 | A1 | 1/2008 | Gudipaty et al. |
| 2008/0064331 | A1 | 3/2008 | Washiro et al. |
| 2008/0075163 | A1 | 3/2008 | Brydon et al. |
| 2008/0211727 | A1 | 9/2008 | Elmore et al. |
| 2009/0079660 | A1 | 3/2009 | Elmore et al. |
| 2009/0258652 | A1 | 10/2009 | Lambert et al. |
| 2010/0050221 | A1 | 2/2010 | Mccutchen et al. |
| 2011/0110404 | A1 | 5/2011 | Washiro |
| 2011/0132658 | A1 | 6/2011 | Miller, II et al. |
| 2011/0187578 | A1 | 8/2011 | Farneth et al. |
| 2013/0064311 | A1 | 3/2013 | Turner et al. |
| 2013/0229581 | A1 | 9/2013 | Joshi et al. |
| 2013/0266065 | A1 | 10/2013 | Paczkowski et al. |
| 2013/0330055 | A1* | 12/2013 | Zimmermann .... H04N 21/2743 386/240 |
| 2014/0285277 | A1 | 9/2014 | Herbsommer et al. |
| 2015/0103079 | A1 | 4/2015 | Khambanonda et al. |
| 2015/0156096 | A1 | 6/2015 | Roh |
| 2016/0012855 | A1* | 1/2016 | Krishnan ............. G11B 27/105 386/241 |
| 2016/0142697 | A1 | 5/2016 | Budagavi et al. |
| 2016/0198140 | A1 | 7/2016 | Nadler |
| 2016/0260196 | A1 | 9/2016 | Roimela et al. |
| 2016/0267717 | A1* | 9/2016 | Bar-Zeev ............. G02B 27/017 |
| 2016/0277772 | A1 | 9/2016 | Campbell et al. |
| 2016/0301957 | A1 | 10/2016 | Mccarthy et al. |
| 2016/0353146 | A1 | 12/2016 | Weaver et al. |
| 2016/0364017 | A1 | 12/2016 | Wang |
| 2017/0026659 | A1 | 1/2017 | Lin et al. |
| 2017/0075416 | A1* | 3/2017 | Armstrong .............. G06F 3/011 |
| 2017/0223368 | A1 | 8/2017 | Abbas et al. |
| 2017/0236252 | A1 | 8/2017 | Nguyen et al. |
| 2017/0237983 | A1 | 8/2017 | Adsumilli et al. |
| 2017/0251208 | A1 | 8/2017 | Adsumilli et al. |
| 2017/0289219 | A1 | 10/2017 | Khalid et al. |
| 2017/0302918 | A1 | 10/2017 | Mammou et al. |
| 2017/0332117 | A1 | 11/2017 | Haritaoglu et al. |
| 2017/0339392 | A1 | 11/2017 | Forutanpour et al. |
| 2017/0339416 | A1 | 11/2017 | Hendry et al. |
| 2017/0347120 | A1 | 11/2017 | Chou et al. |
| 2017/0347163 | A1 | 11/2017 | Wang |
| 2017/0374375 | A1 | 12/2017 | Makar et al. |
| 2018/0011313 | A1 | 1/2018 | Nahman et al. |
| 2018/0033163 | A1 | 2/2018 | Sugimoto |
| 2018/0115743 | A1* | 4/2018 | McLoughlin .......... H04N 21/20 |
| 2018/0124342 | A1 | 5/2018 | Uyeno et al. |
| 2018/0160160 | A1 | 6/2018 | Swaminathan et al. |
| 2018/0165830 | A1 | 6/2018 | Danieau et al. |
| 2018/0176457 | A1 | 6/2018 | Koskan et al. |
| 2018/0270531 | A1* | 9/2018 | Ye .................... H04N 21/44218 |
| 2018/0368037 | A1 | 12/2018 | Wang et al. |
| 2019/0102944 | A1 | 4/2019 | Han et al. |
| 2019/0200058 | A1 | 6/2019 | Hall et al. |
| 2019/0208200 | A1 | 7/2019 | Galpin et al. |
| 2019/0268584 | A1 | 8/2019 | Leleannec et al. |
| 2019/0281318 | A1 | 9/2019 | Han et al. |
| 2019/0313097 | A1 | 10/2019 | Urban et al. |

FOREIGN PATENT DOCUMENTS

| | | |
|---|---|---|
| WO | 2015197818 A1 | 12/2015 |
| WO | 2016171404 A1 | 10/2016 |
| WO | 2017093611 A1 | 6/2017 |
| WO | 2017140945 A1 | 8/2017 |
| WO | 2017205648 | 11/2017 |
| WO | 2017205794 | 11/2017 |
| WO | 2018009746 | 1/2018 |

OTHER PUBLICATIONS

Barlow, H. M. et al., "Surface Waves", 621.396.11 : 538.566, Paper No. 1482 Radio Section, 1953, pp. 329-341.
Corbillon, Xavier et al., "Viewport-Adaptive Navigable 360-Degree Video Delivery", May 1, 2017, 7 pages.
Corridor Systems, "A New Approach to Outdoor DAS Network Physical Layer Using E-Line Technology", Mar. 2011, 5 pages.
El-Ganainy, Tarek et al., "Streaming Virtual Reality Content", School of Computing Science, Simon Frasier University, Dec. 26, 2016, pp. 1-8.
Goubau, Georg et al., "Investigation of a Surface-Wave Line for Long Distance Transmission", 1952, 263-267.
Goubau, Georg et al., "Investigations with a Model Surface Wave Transmission Line", IRE Transactions on Antennas and Propagation, 1957, 222-227.
Goubau, Georg, "Open Wire Lines", IRE Transactions on Microwave Theory and Techniques, 1956, 197-200.
Goubau, Georg, "Single-Conductor Surface-Wave Transmission Lines", Proceedings of the I.R.E., 1951, 619-624.
Goubau, Georg, "Surface Waves and Their Application to Transmission Lines", Radio Communication Branch, Coles Signal Laboratory, Mar. 10, 1950, 1119-1128.

(56) References Cited

OTHER PUBLICATIONS

Goubau, Georg, "Waves on Interfaces", IRE Transactions on Antennas and Propagation, Dec. 1959, 140-146.
Ren-Bin, Zhong et al., "Surface plasmon wave propagation along single metal wire", Chin. Phys. B, vol. 21, No. 11, May 2, 2012, 9 pages.
Sommerfeld, A., "On the propagation of electrodynamic waves along a wire", Annals of Physics and Chemistry New Edition, vol. 67, No. 2, 1899, 72 pages.
Wang, Kanglin, "Dispersion of Surface Plasmon Polaritons on Metal Wires in the Terahertz Frequency Range", Physical Review Letters, PRL 96, 157401, 2006, 4 pages.
Hosseini, Mohammad et al., "Adaptive 360 VR Video Streaming: Divide and Conquer!", Multimedia (ISM), 2016 IEEE International Symposium, IEEE, 2016., 2016, 6 pages.
Kuzyakov, Evgeny, "Next-Generation Video Encoding Techniques for 360 Video and VR", Jan. 21, 2016, 7 pages.
Ozcinar, Cagri et al., "Viewport-Aware Adaptive 360 Video Streaming Using Tiles for Virtual Reality", IEEE International Conference on Image Processing 2017, Sep. 2017, 15 pages.
Petrangeli, Stefano et al., "An HTTP/2-Based Adaptive Streaming Framework for 360 Virtual Reality Videos", Proceedings of the 2017 ACM on Multimedia Conference, ACM, 2017., Oct. 23-27, 2017, 9 pages.
Qian, Feng et al., "Optimizing 360 Video Delivery Over Cellular Networks", Proceedings of the 5th Workshop on All Things Cellular: Operations, Applications and Challenges, ACM, 2016., Oct. 3-7, 2016, 6 pages.

\* cited by examiner

200

400

300

320

340

500

520

540

560

700

SELECTIVE STREAMING OF IMMERSIVE VIDEO BASED ON FIELD-OF-VIEW PREDICTION

CROSS REFERENCE TO RELATED APPLICATIONS

The present application claims priority to U.S. Provisional Patent Application No. 62/566,781, filed Oct. 2, 2017. The contents of the foregoing is hereby incorporated by reference into this application as if set forth herein full.

FIELD OF THE DISCLOSURE

The subject disclosure relates to selective streaming of immersive video based on field-of-view prediction.

BACKGROUND

Recent years have witnessed increasing commercial progress of the virtual reality (VR) technology, which has eventually stepped out of labs. It is projected to form a substantial market by 2020. Users can now experience VR capabilities on their mobile devices using affordable VR devices such as a Google Cardboard. Immersive videos, also known as 360-degree videos or spherical videos, play an important role in a VR ecosystem. Such immersive videos provide users with panoramic views and create a unique viewing experience. Immersive videos, such as 360-degree videos can be recorded by specially adapted cameras, such as omnidirectional cameras or camera array systems (e.g., Facebook Surround 360 Open Edition camera design and stitching code). They simultaneously record all 360 degrees of a scene that can be "wrapped" onto at least a portion of a 3D sphere, with the cameras at its center.

BRIEF DESCRIPTION OF THE DRAWINGS

Reference will now be made to the accompanying drawings, which are not necessarily drawn to scale, and wherein.

DETAILED DESCRIPTION

Figure 1:
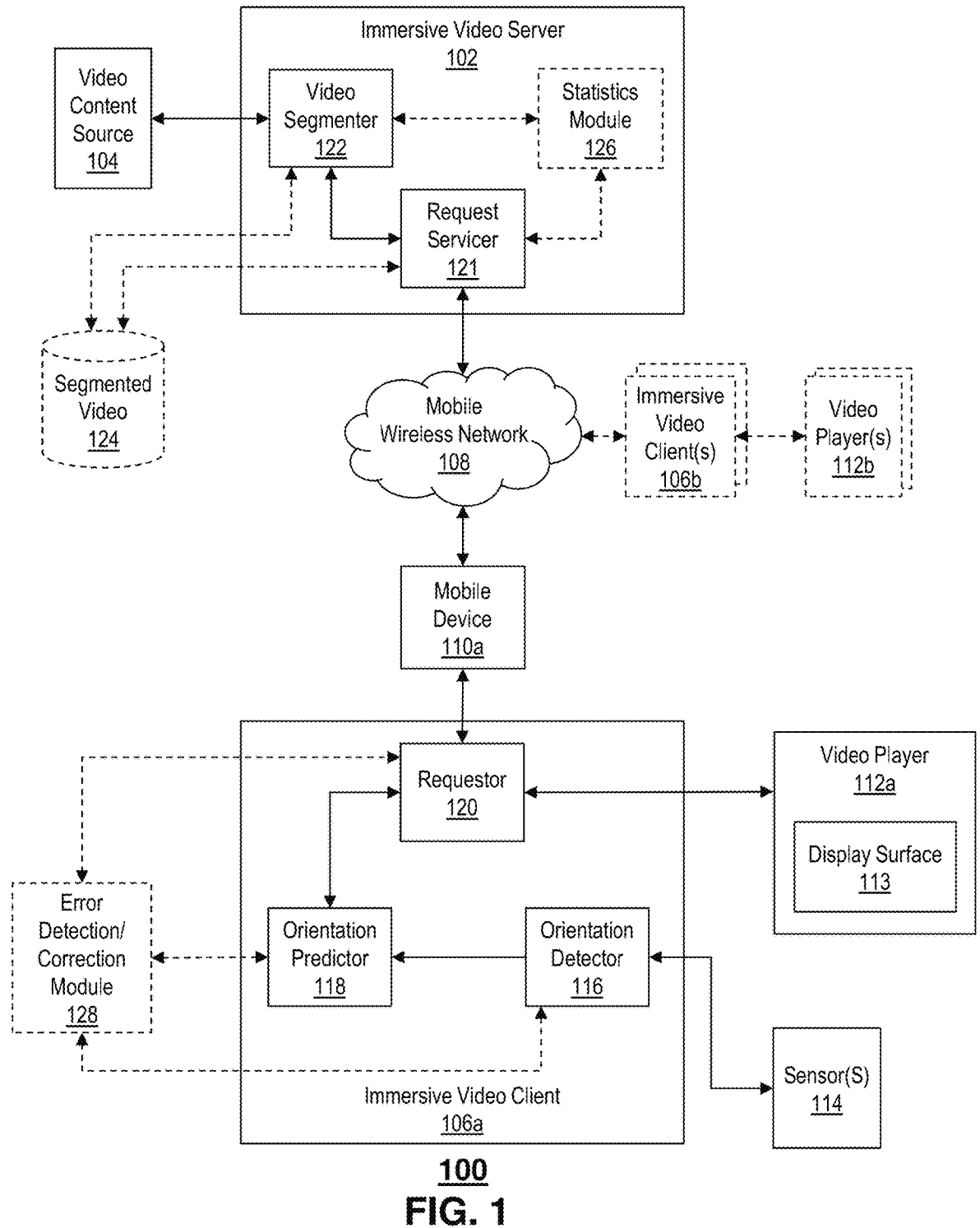
FIG. 1 depicts an illustrative embodiment of an immersive video processing system.

The subject disclosure describes, among other things, illustrative embodiments for detecting, estimating and/or predicting a future orientation of an immersive viewing device having a display surface that corresponds to a field-of-view. The field of view, in turn, corresponds to a sub-region of an immersive video media item that is determined in reference to a viewing location based on a predicted orientation and/or position of the immersive viewing device at a future time. A subsegment of the original immersive video media item including the sub region can be delivered to the immersive viewing device over a network in anticipation of a future time, without requiring delivery of the entire immersive video media item. The immersive viewing device can thus display the field-of-view associated with the predicted orientation/position at the future time, and at a significant savings in one or more of bandwidth, processing resources, and storage resources that would have otherwise been applied to delivery of the full original immersive video media item.

One or more aspects of the subject disclosure include a process that determining, by a processing system including a processor, a field-of-view of an immersive video viewer, determining, by the processing system, a present orientation of the immersive video viewer at a first time, and predicting, by the processing system, a future orientation of the immersive video viewer occurring at a second time, to obtain a predicted orientation of the immersive video viewer based on the present orientation of the immersive video viewer. A spatial subsegment of an entire immersive video frame of an immersive video media item, corresponding to the second time is identified, by the processing system, based on the predicted orientation of the immersive video viewer and the field-of-view. Wireless transmission is facilitated, by the processing system, of the spatial subsegment of the entire immersive video frame to the immersive video viewer for presentation at the immersive video viewer at the second time, without requiring transmission of the entire immersive video frame.

One or more aspects of the subject disclosure include non-transitory, machine-readable storage medium, including executable instructions that, when executed by a processing system including a processor, facilitate performance of operations. The operations include identifying an immersive video viewer including a field-of-view, determining a present orientation of the immersive video viewer at a first time, and predicting a future orientation of the immersive video viewer occurring at a second time, to obtain a predicted orientation of the immersive video viewer based on the present orientation of the immersive video viewer. A first spatial region of an immersive video frame corresponding to the second time is identified based on the predicted orientation of the immersive video viewer and the field-of-view. The immersive video frame includes the first spatial region and a second spatial region. Wireless transmission is facilitated of the first spatial region of the immersive video frame to the immersive video viewer for presentation at the immersive video viewer at the second time, without requiring transmission of the second spatial region.

One or more aspects of the subject disclosure include a device, including a processing system including a processor and a memory that stores executable instructions that, when executed by the processing system, facilitate performance of operations. The operations include identifying a video viewer having a field-of-view, determining a present orientation of a display region presented at a first time on a display of the video viewer, and predicting a future orientation of the display region occurring at a second time, to obtain a predicted orientation of the display region to be presented at the second time on the display of the video viewer. A first spatial region of a video frame corresponding to the second time is identified based on the predicted orientation of the display region and the field-of-view. The video frame includes the first spatial region and a second spatial region. Wireless transmission is facilitated of the first spatial region of the video frame to the video viewer for presentation at the video viewer at the second time, without requiring transmission of the second spatial region.

FIG. 1 depicts an illustrative embodiment of an immersive video processing system 100. The system 100 includes an immersive video server 102 in communication with a video content source 104. The video content sources 104 provides immersive video content, such as 360-degree video media items, panoramic video media items, stereo video media items, 3D video media items, and the like. The immersive video server 102 is in further communication with an immersive video client 106 via a communication network 108.

In the illustrative example, the communication network 108 includes a wireless mobile network, such as a cellular network. It is understood that the communications network can include, without limitation, one or more wireless network components, such as, mobile cellular network components, WiFi network components, satellite network components, terrestrial radio network components, and the like. Alternatively or in addition, the communication network 108 can include one or more wired network components, such as Ethernet, SONET, circuit-switched network components, e.g., SS7, cable, and the like. Although the example network 108 is illustrated by a single cloud, it is understood that the network 108 between the immersive video server 102 and the immersive video client 106a can include one or more networks of the same, similar and/or different configurations, e.g., combinations of wired and wireless, terrestrial, satellite, and the like.

Continuing with the illustrative example, the immersive video client 106a is in network communication with the wireless mobile network 108 by way of a mobile device 110a. The mobile device 110a can include, without limitation, any of the various devices disclosed herein or otherwise generally known to those skilled in the art of communications, such as mobile telephones, tablet devices, laptops, and the like. In a context of machine-to-machine (M2M) communications, e.g., according to an Internet of Things (IoT) paradigm, the mobile device 110a can include a machine, such as an appliance, a vehicle and the like.

The immersive video client 106a is in further communication with one or more of a video player 112a and a sensor 114. For example, the video player 112a can include a media processor and/or a display device 113, such as a tablet display, a laptop display, a mobile phone display, gaming glasses or goggles, and the like. The sensor 114 can include one or more sensors generally adapted to facilitate determination of an orientation of a display surface 113 of the video player 112a. For example, the sensor 114 can include an inertial sensor, such as an accelerometer, that can detect and/or estimate a position and/or a change in position of the display surface 113 of the video player 112a. Sensors 114 can include those commonly found in smart phones and/or tablet devices. It is understood that in at least some embodiments, the sensors 114 can be internal to and/or otherwise attached to the video player 112a and/or the display surface 113. Accordingly, the sensors 114 can detect position and/or orientation of the display surface 113 based on the physical orientation and/or change in orientation of the video player 112a. Alternatively or in addition, the sensors 114 can be separate from the video player 112a. For example, the sensors 114 can include one or more of a motion sensor and/or a video sensors adapted to detect motion and/or position of the video player 112a. In at least some embodiments, a position and/or orientation of the display surface 113 of the video player 112a can be inferred or otherwise determined from a predetermined configuration of the display surface 113 within the video player 112a.

The example immersive video client 106a, includes an orientation detector 116, an orientation predictor 118 and a requestor 120. The orientation detector 116 is in communication with the sensors 114 and adapted to determine an orientation of the video player 112a, or more particularly, of a display surface 113 of the video player 112a based on sensor data obtained from the sensors 114.

The orientation of the video player 112a and/or display surface 113 can include, without limitation, a first direction, such as an azimuth angle and a second direction, such as an elevation angle. The azimuth angle and elevation angle, taken together can define a pointing direction of a normal to the display surface 113. In at least some embodiments, the azimuth angle and elevation angle can be further combined with a twist or rotation angle that further defines a rotational orientation of the display surface 113 with respect to the pointing direction.

In at least some embodiments, the orientation and or position of the display surface 113 can be defined in reference to a center of a coordinate system. Example coordinate systems can include spherical coordinate systems, cylindrical coordinate systems, polar coordinate systems, Cartesian coordinate systems and the like. By way of example, the orientation or position of the display surface 113 can be defined by rotations about orthogonal axis, such as rotations about x, y and z axes of a rectangular coordinate system. These angles are sometimes referred to as pitch, yaw and roll.

The immersive video server 102 includes a request servicer 120, and a video segmenter 122. The example video segmenter 122 is in communication with the video content source 104, and adapted to segment an immersive video media obtained from the video content source 104 into a plurality of spatial subsegments or subregions. For example, the segmenter 112 can divide an immersive video frame into a number of subsegments, subregions or subframes. For a rectangular immersive video frame, the subsegments or subregions can be rectangles. It is understood that the subsegments and subregions can adapt to other shapes based on one or more of the nature of the immersive video frame, the display surface, one or more projection algorithms as may be applied and so on. For a spherical projection of a 360-degree video, the subregions can be portions of a spherical surface, e.g., defined according to a spherical coordinate system. Alternatively or in addition, the subregions can be portions of a cylindrical surface and/or portions of a rectangular surface. Even though the projected surface portrayed in the immersive video frame may confirm to a particular geometry, it is understood that the shape and/or size of the subsegments and/or subregions can be the same, similar and/or different. For example, the subsegments and/or subregions can be determined according to a projection algorithm, e.g., mapping a spherical surface to a cylindrical and/or rectangular surface.

It is generally understood that segmentation of an immersive video media item can be performed in real time or near-real time, e.g., in association with and/or responsive to a particular request from a requestor 120 of a particular immersive video client 106a. Alternatively or in addition, segmentation can be performed beforehand, e.g., offline, and stored for later use. In some embodiments, segmentation data alone or in combination with a segmented version of the immersive video media item can be stored in an optional segmented video repository 124 (shown in phantom).

Segmentation data can include, without limitation, identification of the subsegments and/or subregions of a segmented immersive video media item. For example, this can include individually addressable segments, e.g., subsegment (i, j) of an M×N array of subsegments of a particular immersive video frame. As immersive video media items can include arrays of immersive video frame, it is understood that a common subsegment referencing and/or indexing scheme can be applied to more than one, e.g., all, frames of a particular immersive video media item. Accordingly, subsegments and/or subregions can be identified and addressed independently and/or collectively in groups. Groups of subsegments and/or subregions can conform to a particular shape, e.g., a contiguous shape, such as a rectangle, an oval, and the like. Alternatively or in addition, subsegments and/or subregions can be addressed according to ranges.

In operation, the orientation detector 116 determines actual and/or estimated orientations of the video player and/or display surface 113, based on input from the sensors 114. Actual orientations are provided to the orientation predictor 118, which, in turn, predicts a future position and/or orientation of the video player 112a and/or the display surface 113. As described further hereinbelow, the orientation predictor 118 can apply one or more algorithms that can predict future position/orientation based at least in part on past positions/orientations.

The orientation predictor 118, in turn, provides an indication of a predicted position and/or orientation to the requestor 120. In at least some embodiment, the predicted position/orientation is further associated with a future time at which the position/orientation of the video player 112a and/or display surface 113 has been determined. The requestor 120, in at least some embodiments, can be adapted to determine other information, such as a field-of-view of the video player 112a and/or display surface 113. The field-of-view can be defined according to one or more of spatial dimensions on a mapped surface, angular ranges and/or pixel ranges. It is understood that in at least some embodiments, that the field of view may differ according to one or more of orientation, e.g., looking down versus straight ahead, a type of projection used in association with the immersive video frame, and so on.

In at least some embodiments, the requestor 120 receives an indication and/or is otherwise pre-configured with information describing how the subsegmentation/subregions are/ have been applied to the immersive video frames. Together with the predicted position/orientation and the field of view, the requestor 120 can determine which subsegments/subregions will fall in and/or near the display surface 113 at the future time associated with the prediction, e.g., 0.5 sec, or 1-sec into the future.

In at least some embodiments, the prediction time can be selectable and/or variable. For example, the prediction time can be based on one or more of data transfer size and/or bandwidth, network conditions, subscription levels, quality of experience, and the like. It is understood that network bandwidth and/or latency can depend upon network conditions, such as congestion, interference, signal propagation loss, and the like. Accordingly, the prediction time can be based upon an estimate of a difference between a time at which a request is made by the requestor 120 and a time at which the requested segments/regions are of a requested segment size are delivered to the immersive video client. Other delays can be factored into this determination, such as processing delays of one or more of the immersive video client, the video player 112a and/or the immersive video server 102.

The request servicer 120 is in communication with the requestor 120 via the wireless mobile network 108. The requestor 120 submits a request for a group of subsegments or subregions of a particular immersive video frame. The request servicer 121 receives the request and responds by facilitating transfer of the requested subsegments/subregions via the mobile network 108. It is understood that the request servicer 121 can service a single request by sequential, e.g., serial, delivery of individual subsegments of the requested group, and/or contemporaneous, e.g., parallel, delivery of multiple segments of the requested group. In at least some embodiments, individual requests can be made and processed according to each subsequent video frame of an immersive video media item. Alternatively or in addition, the processing can be applied to groups of frames. For example, a single prediction can be made at a prediction time, and then used to process more than one frame of the immersive video media item. In some instances, multiple frames include separate frames of a stereo and/or 3D immersive video media item, e.g., left and right frame components. In at least some embodiments, the same request is made for successive video frames of an immersive video media item. This can provide some relief to the processing and cut down on overhead, possibly at a sacrifice of accuracy, due to increased estimate times.

In some embodiments, the immersive video server 102 includes a statistics module 126 (shown in phantom). The statistics module 126 can determine statistics based multiple requests that can be used, in turn, by one or more of the request servicer 121, the video segmenter 122, thee requester 120 and/or the orientation predictor 118. For example, the statistics module 126 can track requests received from multiple immersive video clients 106a, 106b (generally 106) and or video players 112a, 112b (generally 112). The statistics module 126 can associated past requests with one or more of immersive video media item. It is envisioned that some regions of an immersive video frame may be requested more than others based on a nature of the immersive video media item content. Accordingly, segments can be associated with a frequency, based on past requests, as described further hereinbelow. Alternatively or in addition, the statistics module 126 can associate one or more of network conditions, time of day, day of week, service level, requestor profile, region, demographics and the like. Statistics can be determined according to one or more of the example parameters and used in association with subsequent requests to improve system performance by reducing errors, reducing quantities of invisible segments as may be associated with requests to manage errors and so on.

In some embodiments, the system 100 optionally includes an error detection and/or correction module 128 (shown in phantom). In the illustrative embodiment, the error detection/correction module 128 is in communication with one or more of the orientation detector 116, the orientation predictor 118 and the requestor 120. In some embodiments, the error detection/correction module 128 stores a prediction received from the orientation predictor 118. At a later time corresponding to the prediction, the error detection/correction module 128 receives an actual position from the orientation detector 116. An error can be determined according to a difference between the predicted and actual positions. To the extent that an error is determined, one or more of the requestor 120 and the video player 112a can process received subsegments to improve performance. As disclosed hereinbelow, the request can be services with subsegments of the immersive video frame that overlap the field of view, sometimes referred to as visible segments, as well as frames that border and/or surround the overlapped frames, without overlapping the predicted field of view.

It is understood that in at least some embodiments, the error detection/correction module 128 can be in communication with the statistics module 126 to facilitate statistical tracking of errors. For example, if the errors are significant, the quantity of invisible segments can be increased and/or a quality of invisible segments can be increased in anticipation of errors. Although such increases to the quantity and/or quality of invisible subsegments generally reduces bandwidth savings, savings may still be realized when compared to an alternative of transferring the entire immersive video frame. Even in instances in which error performance dictates that the entire immersive video frame be transferred, the system 100 will allow for bandwidth savings to be realized during other periods when error performance may be less.

Figure 2:
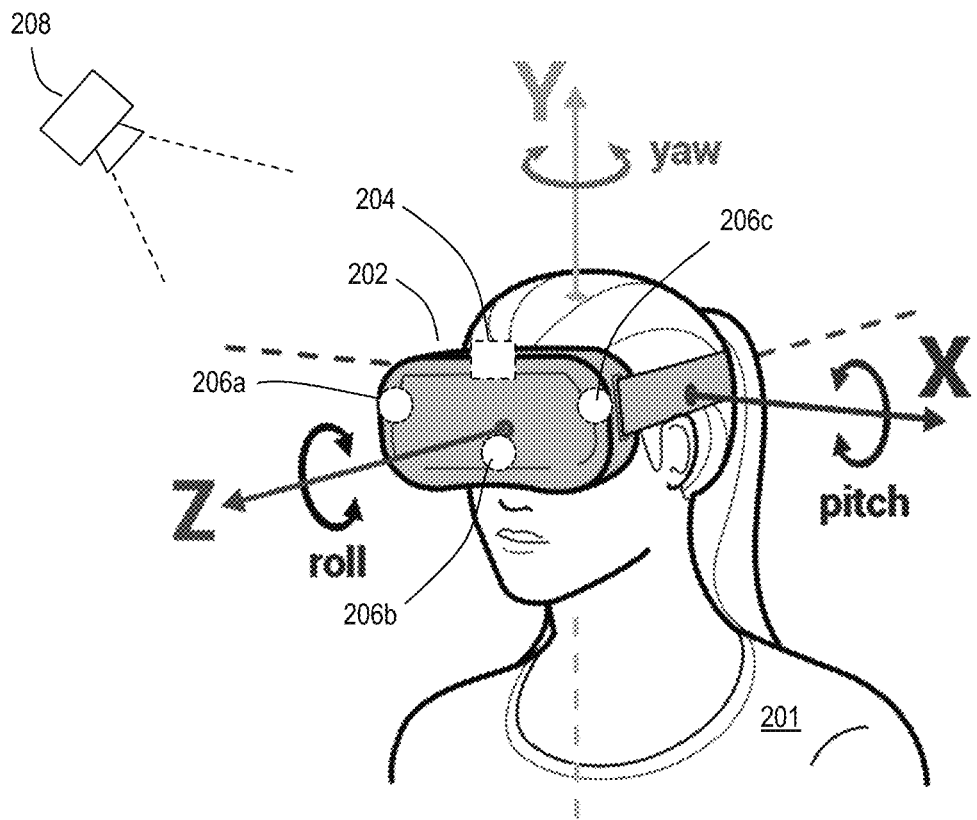
FIG. 2 depicts an illustrative embodiment of a video viewing device.

When watching an immersive, e.g., 360-degree, video, a viewer 112a at a center of an immersive video media presentation, e.g., at a spherical center, can freely control her viewing direction, so each playback creates a unique experience. As shown in FIG. 2, a user 201 wearing a VR headset 202 can adjust her orientation by changing the pitch, yaw, and/or roll of the VR headset 202, which correspond to rotating along one or more of the X, Y, and Z axes, respectively. Then a 360 video player, e.g., within the VR headset 202, computes and displays a viewing area, i.e., a display surface, based on the orientation and the field-of-view (FoV). The FoV can define an extent of the observable area, which is usually a fixed parameter of a VR headset (e.g., 110° horizontally and 90° vertically).

The example VR headset 202 can be equipped with a position and/or orientation sensor 204, such as position/orientation sensors available on smartphones, gaming goggles and/or tablet devices. Alternatively or in addition, the VR headset 202 includes one or more reference markers 206a, 206b, 206c (generally 206). The reference markers 206 are spaced apart in a predetermined configuration. An external sensor, such as a video camera 208, is positioned to observe the FR headset 202 during active use. The external sensor 208 detects positions of the reference markers 206. Further processing, e.g., by an orientation detector 116 (FIG. 1) can determine a position and/or orientation of the VR headset 202 based on the detected/observed positions of the reference markers 206.

Such immersive videos are very popular on major video platforms such as YOUTUBE® and FACEBOOK® platforms. Despite their popularity, the research community appears to lack an in-depth understanding of many of its critical aspects such as performance and resource consumption. The disclosure provided herein is intended to fill this gap by investigating how to optimize immersive video delivery over wireless mobile, e.g., cellular, networks, which are anticipated as forming a key infrastructure that facilitates ubiquitous access of network accessible VR resources, e.g., in the cloud. Measurements were conducted on two commercial 360-degree video platforms: YouTube and Facebook to obtain an understanding the state-of-the-art of 360-degree video delivery. To a large extent, 360 video inherits delivery schemes from traditional Internet videos. This simplifies the deployment, but makes 360-degree video streaming very cellular-unfriendly, because the video player always fetches the entire video including both visible and invisible portions. This leads to tremendous resource inefficiency on cellular networks with limited bandwidth, metered link, fluctuating throughput, and high device radio energy consumption.

As an important component of the virtual reality (VR) technology, immersive videos provide users 201 with panoramic views allowing them to freely control their viewing direction during video playback. Usually, a player 202 displays only the visible portion of an immersive video. Thus, fetching the entire raw video frame wastes bandwidth. The techniques disclosed herein address the problem of optimizing immersive video delivery over wireless, e.g., cellular, networks. A measurement study was conducted on commercial 360 video platforms. A cellular-friendly streaming scheme is disclosed that delivers only a 360 video's visible portion based on head movement prediction. Viewing data collected from real users was used to demonstrate feasibility of an approach that can reduce bandwidth consumption by up to 80% based on a trace-driven simulation.

Conceptually, a novel cellular-friendly streaming scheme for immersive videos avoids downloading an entire immersive video, instead only fetching those parts, e.g., spatial segments or portions, of the immersive video that are visible to the user 201 in order to reduce bandwidth consumption associated with the video transfer. As display of any of the portion of the immersive video requires that the portion be fetched or otherwise downloaded, the disclosed approach benefits from a prediction of a viewer's head movement (to determine which portion of the immersive video view to fetch). Five users' head movement traces were collected when watching real YouTube 360 videos. Trace-driven analysis indicated that, at least in the short term, a viewers' head movement can be accurately predicted, e.g., with an accuracy >90%, by even using simple methods such as linear regression. Design considerations include handling prediction errors and integration with DASH and HTTP.

Measurements of two popular video platforms: YouTube and Facebook, were performed to evaluate how 360 videos are currently delivered by commercial video platforms. In more detail, measurements were performed using an official YouTube app on a Samsung Galaxy S5 phone running Android 4.4.2, while observing some of the most popular YouTube 360 videos. During video playback, HTTPS transactions were captured by redirecting all traffic to a "man-in-the-middle" proxy (using mitmproxy). For Facebook, several popular 360 videos were observed in a Chrome browser on a Windows 10 laptop, using a Chrome debugging tool to analyze HTTPS transactions.

Both YouTube and Facebook presently encode 360 videos into a standard H.264 format in an MP4 container. It is understood that a 360 video can be playable in conventional media players, e.g., only showing raw frames as exemplified in by a large image 300 in FIG. 3A. As shown, the raw frame 300 is distorted because it was projected from the 3D panoramic sphere. When a viewing area of a virtual reality headset is determined, the visible portion is then reversely projected from the raw frame to the screen, as illustrated by the two smaller images 320, 340 shown in FIG. 3B and FIG. 3C.

The raw video frames of the different 360 sources, e.g., YouTube and Facebook, exhibit different visual "patterns" based on their use of different projection algorithms. For example, YouTube was found to employ an equi-rectangular projection that directly uses the latitude and longitude on a sphere as the vertical and horizontal coordinates, respectively, on the raw frame. Facebook was found to employ a different projection scheme, referred to as Cube Map that offers less distortion in the polar areas of the sphere.

Both YouTube (on Android app) and Facebook (on Chrome for Windows 10) use progressive download over HTTP, a widely used streaming technique, to deliver 360 videos. Progressive download allows a client to start playing the video before it is fully downloaded. It is realized using HTTP byte range request.

Both video platforms support multiple encoding bitrates for 360 videos. The viewer can switch between standard definition (SD) and high definition (HD) versions on Facebook. YouTube provides up to 8 bitrate levels from 144 s to 2160 s. Note the video quality numbers refer to the resolution of the entire raw frame 300 FIG. 3A, in which the viewer only sees a small portion at any given time, e.g., a first portion 302 depicted in the image 320 of FIG. 3B or a second portion 304 depicted in the image 340 of FIG. 3C. Therefore, to achieve the same user-perceived playback quality, the raw frame quality of a 360 video has to be much higher than that of a non-360 video. For a decent user experience, a 360 video can be streamed at at least 1080 s, whereas, a reasonable quality for conventional videos can be less, e.g., 480p. However, when watching the video in FIG. 3A under 480 s, the quality can be unacceptably bad, e.g., depending upon the viewing angle, because the viewer 201 (FIG. 2) in fact has a stretched view of a subarea of a 480 s frame.

As a direct consequence of the above observations, for the same user 201 perceived quality, 360 videos have very large sizes. Table 1 lists sizes of four example 360 videos on the YouTube platform, assuming 1080p is the minimum video quality for a reasonable QoE. This inevitably causes issues on cellular networks with limited bandwidth (in particular when signal strength is not good) and metered link.

TABLE 1

Sizes of four 360 videos on YouTube.

| Video Scene | Length | 1080 s | 1440 s | 2160 s |
| --- | --- | --- | --- | --- |
| Roller coaster | 1'57" | 66 MB | 105 MB | 226 MB |
| Animals | 2'49" | 52 MB | 129 MB | 246 MB |
| Aerobatic Flight | 8'12" | 172 MB | 350 MB | 778 MB |
| Google IO 2016 | 2h8'34" | 1.7 GB | 4.9 GB | 9.1 GB |

For both YouTube and Facebook platforms, the client appears to download the entire raw frame regardless of user's viewing direction. This leads to tremendous waste of network bandwidth, because most areas of a raw frame are not viewed by the user. Based on a simulation disclosed hereinbelow, such unseen or otherwise invisible areas can account for up to 80% of network bandwidth consumed by 360 video playback. Using a single H.264 video stream, it is inherently impossible for a 360 video client to fetch a subarea of a raw frame.

The foregoing measurements indicated that 360 videos largely inherit the delivery scheme from traditional Internet videos. The obvious advantage is simplicity: virtually no change is required on the server side, and a non-360 player can be easily enhanced to support 360 videos by adding projection and head movement detection. However, the negative side is, streaming 360 videos is very bandwidth consuming, because (1) under the same user perceived quality, 360 videos have much larger sizes than non-360 videos, and (2) today's 360 video players always fetch the entire raw frame including both the visible and invisible portion. This may not be a big issue for wired and high-speed WiFi networks. However, the scheme is not friendly to cellular networks where radio resources are scarce and bandwidth is limited. Also, downloading excessive data hurts mobile devices' battery life because cellular radio is known to be energy-hungry: when in active use, the 3GPP LTE radio can account for at least 50% of the entire smartphone's energy consumption.

Improved techniques for 360 video streaming over cellular networks disclosed herein reduce bandwidth consumption, preferably with little or no detrimental effects to playback observed by a VR headset 202 (FIG. 2). Basically, instead of downloading everything, a client 106 (FIG. 1) only fetches the parts that are visible to the user. A bandwidth-efficient 360 video VR display system includes a mechanism that allows a client to download a subarea of a video chunk. A determination of what portion(s) of a frame to fetch is based on a prediction of a viewer's head movement. Preferably, the prediction is robust and efficient. In at least some instances the system 100 (FIG. 1) tolerates inaccurate predictions by strategically sacrificing bandwidth in certain situations. In at least some embodiments, the system incurs minimal changes to the client player the server, or both.

For traditional videos, to support simultaneous download and playback, a video is temporally segmented into chunks or byte ranges. To support downloading a subsegment, subregion or subarea of a video chunk, the video also needs to be spatially segmented. This can be realized in an online manner: the client 106 computes the target area of a chunk, and embeds them into HTTP request parameters; the server then dynamically generates a smaller chunk containing only the target area and transmits it to the client. This approach may suffer from two drawbacks. First, it can increase the server-side computational overhead. Second, due to projection, the target area is not a rectangle, making it hard for the client to specify the target area.

Figure 4:
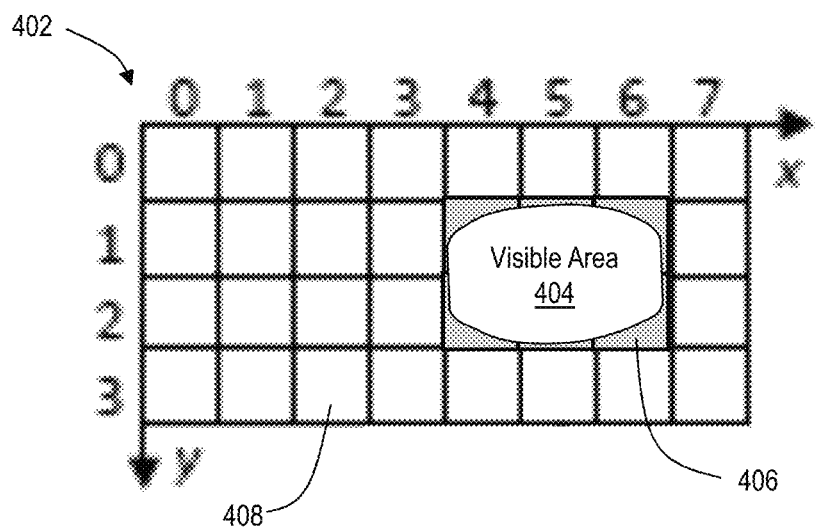
FIG. 4 depicts an illustrative embodiment of spatial segmentation of a video chunk into tiles.
Figure 3A:
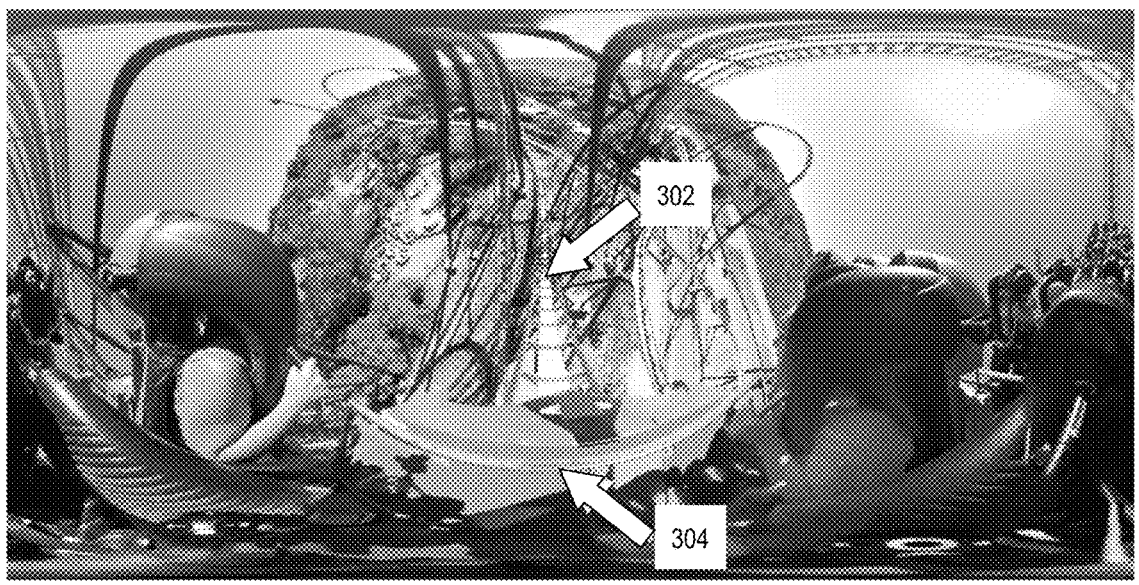
FIG. 3A depicts an illustrative embodiment of a raw frame of 360 video.
Figure 3B:
FIGS. 3B and 3C depict illustrative embodiments of frames visible by the video viewing device of FIG. 2, when a viewer is looking at different viewpoints within the immersive image frame.
Figure 3C:
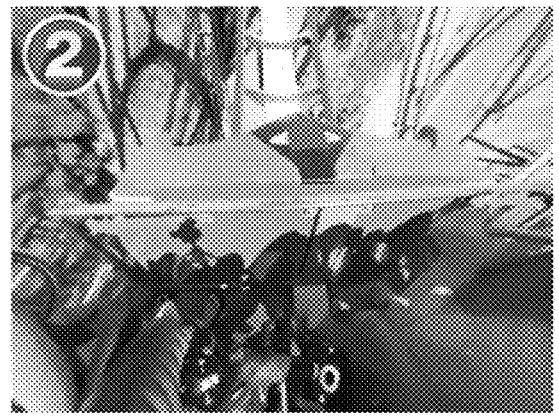
Figure 5A:
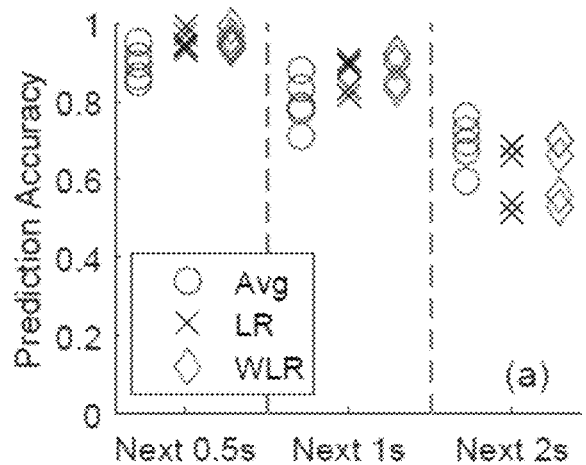
FIGS. 5A through 5D depict, respectively, illustrative prediction results for 360 videos of a roller coaster, NASA Mars, sailing and sports.
Figure 5B:
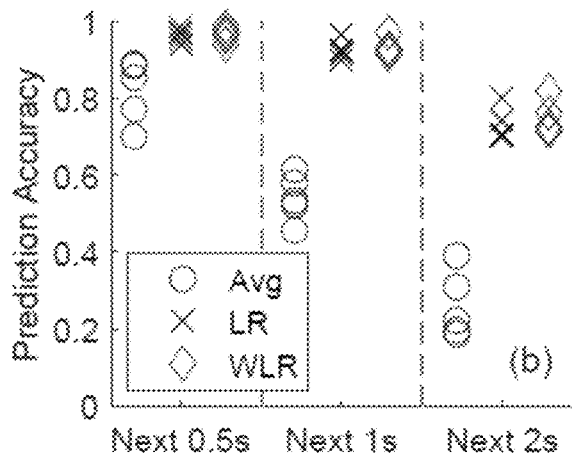
Figure 5C:
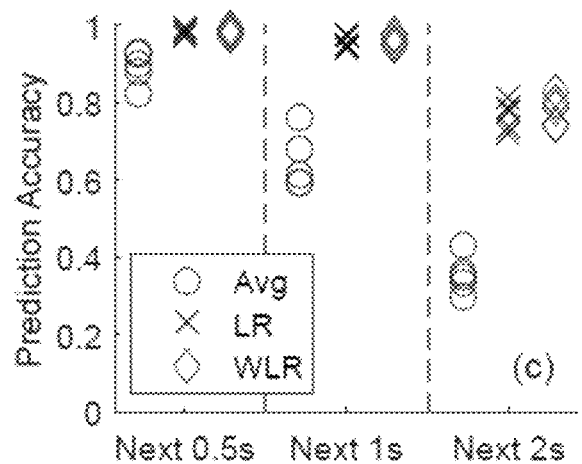
Figure 5D:
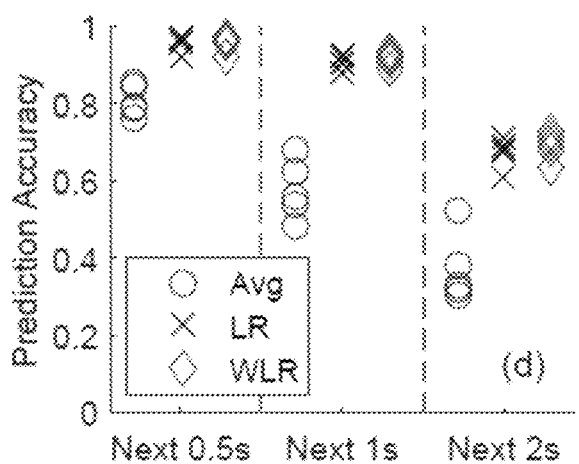

In at least some embodiments, the immersive video media item is spatially segmented offline. For example, each 360 video chunk can be pre-segmented into multiple smaller chunks, referred to herein as tiles. A tile can have the same duration as a chunk, while only covering a subarea of the chunk. At least one way to generate the tiles is to evenly divide a chunk containing projected raw frames into m*n rectangles each corresponding to a tile. Suppose the projected visible area is θ. The client only requests for the tiles that overlap with θ. An example pre-segmented chunk 402 is illustrated in FIG. 4, where m=8 and n=4, resulting in 32 tiles 408 and where the visible area, θ is illustrated as a bounded region 404. The client may only request the six tiles ($4 \leq x \leq 6$; $1 \leq y \leq 2$) overlapping with the visible area 404. Note that due to projection, despite the viewer's field-of-view being fixed, the size of the visible area 404 and thus the number of requested tiles 406 may vary. For example, under equi-rectangular projection, as shown in FIG. 3A, more tiles are needed when the viewer looks downward 304 compared to when she looks straight forward 302.

Besides the above approach, an alternative and more complex way is to apply segmentation directly on an immersive projection surface, such as a 3D sphere of a 360-degree video, instead of on a projected 2D raw frame 402 so that each tile covers a fixed angle, e.g., a fixed solid angle. This makes the number of tiles to be requested irrespective of user's viewing direction (but their total bytes may still vary).

Performing the spatial segmentation of immersive video frames offline can reduce and/or otherwise eliminate server-side overhead. Multiple tiles 408 can be requested in a single bundle to reduce network roundtrips. A tiles' metadata such as positions and/or addresses (e.g., web addresses or URLs) can be embedded in a metafile exchanged at the beginning of a video session.

If a viewer's head movement during a 360 video session is known beforehand, an optimal sequence of tiles can be generated that minimizes the bandwidth consumption. To approximate this in reality, a prediction of head movement is determined, e.g., according to a pitch, yaw, and roll and/or a change of pitch, yaw, and roll.

To evaluate whether a viewer's head movement can be predicted, a user trial of five users was conducted. The experimental setting was as follows. Each user wore a Google Cardboard viewer with a Samsung Galaxy S5 smartphone placed into the back of it. The smartphone played four short YouTube 360 videos (duration from 1'40" to 3'26") of different genres. Meanwhile, a head tracker app ran in the background and sent raw yaw, pitch, and roll readings to a nearby laptop using UDP over WiFi, e.g., latency <1 ms. OpenTrack, an open-source head tracking software, was used to perform preprocessing, e.g., smoothing and head shaking removal, under default settings before recording the data. The sampling rate was 250 Hz. During the playback, the five users could view at any direction by freely moving their heads.

Leveraging the collected traces, an example sliding window of 1 second from $t_0-1$ to $t_0$ was used to predict a future head position at $t_0+\delta$ for each dimension of yaw, pitch, and roll. In this feasibility study, three simple prediction approaches were used: (i) average; (ii) linear regression (LR); and (iii) weighted linear regression (WLR).

According to the first average approach, average value were computed in the window as the prediction result. According to the second linear regression (LR) approach, an LR model was first trained using all samples in the window. The model was subsequently used for prediction. All samples in the window had the same weight. The third weighted linear regression (WLR) approach was similar to LR approach, except that a more recent sample is considered more important: the weight of a sample at $t_0-x$ is set to $1-x$ ($0 \leq x \leq 1$).

For a given window $(t_0-1; t_0)$, the output of the prediction consisted of the estimated yaw, pitch, and roll at $t_0+\delta$. The prediction was considered to be accurate if the predicted values in all three dimensions differed from the true values by less than about 10°, which can be easily compensated by downloading slightly more data. FIGS. 5A-5D shows the prediction results 500, 520, 540, 560 of $\delta \in \{0.5\ s, 1\ s, 2\ s\}$ for the four videos, with each point representing one video playback. The prediction accuracy (Y Axis) of a playback is defined as a number of accurate predictions over a total number of predictions.

Two major findings in the results of FIGS. 5A-5D are described as follows. First, despite the application of relatively simple prediction techniques, good short-term predictability for head movement was observed. Using WLR, the average prediction accuracy values across all users and all videos for $\delta=0.5$ s and is were 96.6%±2.0% and 92.4%±3.7%, respectively. On the other hand, prediction in the longer term was relatively more difficult: the average accuracy drops to 71.2%±7.6% when $\delta=2$ s. Second, it was observed that the prediction methodology does matter, as linear regression significantly outperforms the naïve averaging approach. Using WLR further slightly improves the results. It is understood that in at least some embodiments, more sophisticated machine learning algorithms can be applied to leverage richer training data. Alternatively or in addition, predictions can be further constrained by robust heuristics, e.g., a user will be very unlikely to vary the roll by more than ±15°.

Despite satisfactory short-term predictability, an important consideration is a timing required to fetch tiles. Namely, whether 1 to 2 seconds may be too short to fetch the tiles. Under reasonable cellular network conditions, such a prediction window of 1 to 2 seconds appears to be sufficient for network transfer. Today's 3GPP LTE networks offer high bandwidth and low latency. Assuming 15 Mbps bandwidth, which can be achieved on today's commercial LTE networks, it takes only about 0.53 second to download a 1-second full-frame video chunk at 1080p. Since our scheme only downloads the visible portion, the required bandwidth for fetching the tiles can further be reduced by 60% to 80%. Accordingly, the techniques disclosed herein are quite feasible on today's LTE networks and even more so the 5G networks that offer throughput of up to 1 Gbps.

It is understood that due to human users' randomness, e.g., in movement, prediction errors are inevitable. It is further understood that in at least some embodiments head movement predictability can be highly depend upon the video content. For example, in FIGS. 5A-5D, a roller coaster video depicted in the results 500 in FIG. 5A has higher predictability than a NASA Mars video depicted in the results 520 in FIG. 5B because the former has a more clear "focal point", e.g., the rail of the roller coaster, than the latter.

Prediction errors can be handled using one or more of several strategies. First, due to the online and sliding-window nature of the prediction scheme, a previous inaccurate prediction might be fixed by a more recent and accurate prediction. If the new tiles corresponding to the updated prediction can be fetched before the playback deadline, the penalty is only wasted bandwidth. In at least some embodiments, such fixes can be prioritized as described hereinbelow.

Second, since most prediction errors are expected to be small, they can be tolerated by conservatively fetching more tiles covering a larger area than what is predicted. For example, in FIG. 4, the client can further fetch surrounding tiles such as tiles at positions (3,1) and (4,0). These additionally fetched tiles can be called out-of-sight (OOS) tiles, as they will generally remain invisible unless a prediction error occurs. Clearly, the number of OOS tiles incurs a tradeoff between bandwidth consumption and user experience. It can be, for example, dynamically determined by the recent prediction error e maintained by the player. The larger e is, the more OSS tiles need to be fetched.

Third, to further reduce the bandwidth consumption of OOS tiles, they can be fetched at a lower quality, which depends on their distance to the predicted area. At a high level, this is essentially a variation on Forward Error Correction (FEC), which transmits lower quality versions of alternate data in case of errors. Consider FIG. 4 again. Suppose the six tiles 406 overlapping with the predicted visible area 404 are fetched at quality level n. Then a nearby OOS tile (3,1) might be fetched at quality level n−1, and an OOS tile such as (2,1) that is further away might be fetched at an even lower level. The intuition is, the likelihood that the viewer will watch a far-away OOS is low, but in case that happens, having a low-quality tile will at least ensure the smooth playback without stalling the video.

In a worst case scenario, when the user's head movement is quick and exhibits no trend, a prediction may have relatively low accuracy, which may, in at least some instances, lead to potential stalls and/or leaving part of the display blank if the player chooses to skip the stalls. A fail-safe mechanism can be provided to address these situations. As stalls due to wrong predictions occur more frequently, more OOS tiles can be fetched. Eventually, an immersive video player may fall back to a simple approach of fetching all tiles. In this case, since more tiles are fetched, their quality may be degraded accordingly, e.g., if the bandwidth is limited.

In at least some embodiments, predictions can leverage crowd-sourced statistics. Popular 360 videos from commercial content providers and video sharing websites attract a large number of viewers, e.g., more than 4 million views of a video including the frame 300 illustrated in FIG. 3A. Also, it is known that users' viewing behaviors are often affected by the video content. It is believed to be also true for 360 videos: at certain scenes, viewers are more likely to look at a certain spots or directions. Consider an example of a mountain climbing video. When "standing" at the peak, viewers may want to enjoy the view by looking all around.

Based on the above intuition, crowd-sourced viewing statistics, which can be collected, e.g., by video servers, can be used to complement head movement prediction. Viewing statistics can be leveraged to estimate the video abandonment rate and to automatically rate video contents. In the context of 360 videos, for each chunk, the server records download frequencies of its tiles, and provides client players with such statistics through metadata exchange. A tile's download frequency can be defined as a number of video sessions that fetch this tile divided by the total number of sessions accessing this video. The client can (optionally) use the statistics to guide the download strategy of OOS tiles. For example, a simple strategy is to expand the set of OOS tiles to include tiles whose download frequencies are greater than a configurable threshold. The threshold trades off between bandwidth consumption and user experience.

In at least some embodiments, the predictions and/or selective video fetch of portions of 360 video frames can be integrated with DASH and/or HTTP. Although currently most immersive videos use progressive download, it is envisioned they may switch to a Dynamic Adaptive Streaming over HTTP (DASH). Extensive research has been conducted on improving the QoE of DASH video. A DASH video is split into chunks encoded with multiple discrete bitrate levels; a video player can switch between different bitrate levels at a chunk boundary. In contrast, 360 videos involve more complexity, because the player needs to make decisions at both the temporal and spatial dimension.

An important component of a DASH scheme is its rate adaptation algorithm, which determines the quality level of chunks to fetch. There are largely two categories of approaches: throughput based and buffer-based. A throughput-based rate adaptation algorithm adjusts chunks' quality levels based on estimated throughput. The buffer-based approach, on the other hand, selects the bitrate level based on the player's buffer occupancy level, which implicitly encodes the network capacity information.

For today's immersive video delivery that downloads everything, it requires no change to a DASH algorithm. It is understood that in at least some embodiments, there may be interplay between any of the prediction-based streaming schemes disclosed herein and DASH. At least two categories of DASH algorithms are considered: throughput based and buffer-based. Throughput-based DASH algorithms can work well with the techniques disclosed herein, e.g., when an estimated throughput decreases (increases), the quality level of tiles will decrease (increase) correspondingly. It is understood that the thresholds for quality level switches can be set and/or otherwise adjusted, e.g., statically and/or dynamically. Due to projection and OOS tiles, the required bandwidth in our scheme has higher variance than that for non-360 videos. Thus, the thresholds may need to be adjusted dynamically.

Buffer-based DASH algorithms can also work well with the algorithms can work well with the techniques disclosed herein. One issue here is that in at least some of the disclosed techniques, the player may not want to keep a large buffer occupancy, because predicting viewer's head movement in the long term is difficult (§ 3.3). As a result, since the player only maintains a relatively short duration of video contents in the buffer, buffer based DASH algorithms may interact poorly with at least some of the schemes disclosed herein.

Similar to regular DASH, the schemes disclosed herein, in at least some instances, can use HTTP(S) as an underlying delivery protocol. Each tile can be fetched by an HTTP request. A new observation here is that priorities of HTTP transactions play an important role in mitigating the user experience degradation caused by inaccurate prediction. Consider the following example. The player is in the progress of downloading tile "x" whose playback time is $t_2$. Then suddenly, the player realizes a predicted tile to be played at $t_1 < t_2$ is incorrect. To fix this issue, the player immediately issues a request for tile "y" whose playback time is $t_1$. Since the delivery of tile y is more urgent than tile x, ideally the server should pause the transmission of tile x, and transmit tile y expediently, e.g., at its full speed. This can be realized by giving tile y a higher priority than tile x. New web protocols such as HTTP/2 already support fine-grained control of HTTP transactions' priorities that are very useful in our scheme.

A trace-driven simulator can be used to evaluate how much bandwidth any of the example schemes can potentially save. A input to the simulator can consist of collected user study traces (five users watching four YouTube 360 videos). Recall that a trace consists of a user's head positions (pitch, yaw, and roll) during a 360 video playback at a sampling rate of 250 Hz. A duration of each video chunk is assumed to be 1 second, and the horizontal and vertical FoV are 110° and 90°, respectively (a typical setting for VR headsets). For each chunk, consider three tile configurations were considered: 4×8, 6×12, and 10×20. Given a particular 1-second chunk, our simulator computes the set of tiles to be fetched as follows. First, it computes the visible area Ω on the 3D sphere based on the head position trace and FoV. Second, it projects Ω to θ on the 2D raw frame. By way of illustrative example, the equi-rectangular projection algorithm that used by the YouTube platform can be applied to the techniques disclosed herein. Third, the simulator derives the set of tiles to be fetched by calculating the overlap 406 between θ 404 and all tiles 408 as illustrated in FIG. 4. The bandwidth saving of a video playback can thus be estimated as 1−NF/N where N and NF are the total number of tiles and the number of tiles that are actually fetched, respectively, across all chunks. For simplicity, it can be assumed in at least some instances that all tiles in a video have the same size.

Figure 6A:
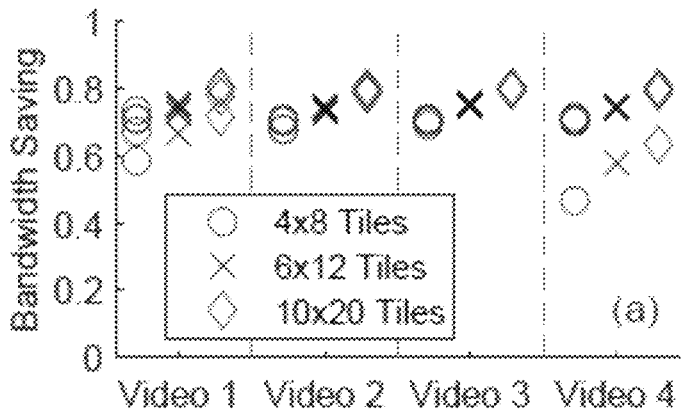
FIGS. 6A through 6C depict, respectively, bandwidth savings with perfect knowledge, with a larger FoV, and with 4-sec video chunk duration.
Figure 6B:
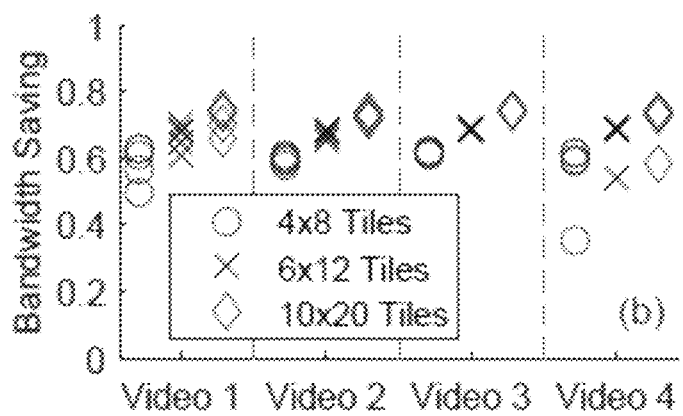
Figure 6C:
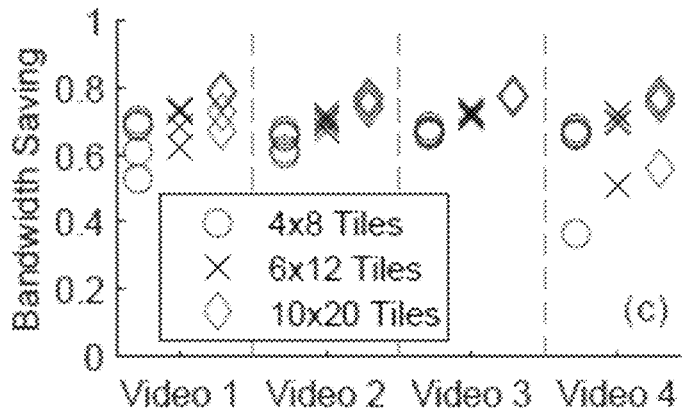

Bandwidth savings were evaluated under three scenarios: (1) the player has the perfect knowledge of head positions; (2) the player fetches additional out-of-sight (OOS) tiles by virtually expanding the FoV by a fixed amount, e.g., 10° in four directions (up, down, left, and right); (3) the player uses the same configurations as (2) except increasing the chunk duration from is to 4 s. The results are shown in a plot 600 of FIG. 6A, a plot 620 of FIG. 6B, and a plot 640 of FIG. 6C, respectively. Several findings are briefly highlighted below. First, in Scenario (1) where the player knows perfectly the head positions, the bandwidth saving can reach up to 80%. Second, when taking OOS tiles into account, the bandwidth saving drops as expected. However, the drop is small: when OOS tiles cover additional 10° FoV in all directions, the maximal bandwidth saving is reduced by only 5%. Third, reducing the tile size leads to higher bandwidth savings. This is because as tiles become smaller, partial overlaps between θ and tiles are reduced. Due to a similar reason, the bandwidth savings decrease when the chunk duration increases to 4 s. Overall, the preliminary results are promising.

The above simulation does not necessarily take prediction errors into consideration. If they are taken into account, the bandwidth consumption slightly increases by about 1.7% on average, compared to Scenario (2) described above (using Weighted Linear Regression with a is window to predict the head position in the next δ=1 s). The penalty is small because of the high prediction accuracy as shown in FIGS. 5A-5D. Also the OOS tiles can already mask many prediction errors.

Beneficially, the cellular-friendly 360 video streaming frameworks disclosed herein do not require dependence on any specific projection scheme. Additionally, the disclosed techniques provide robust processes for tolerating prediction errors, for leveraging crowd-sourced playback statistics, and/or for integrating our scheme with DASH and/or HTTP protocols.

Figure 7A:
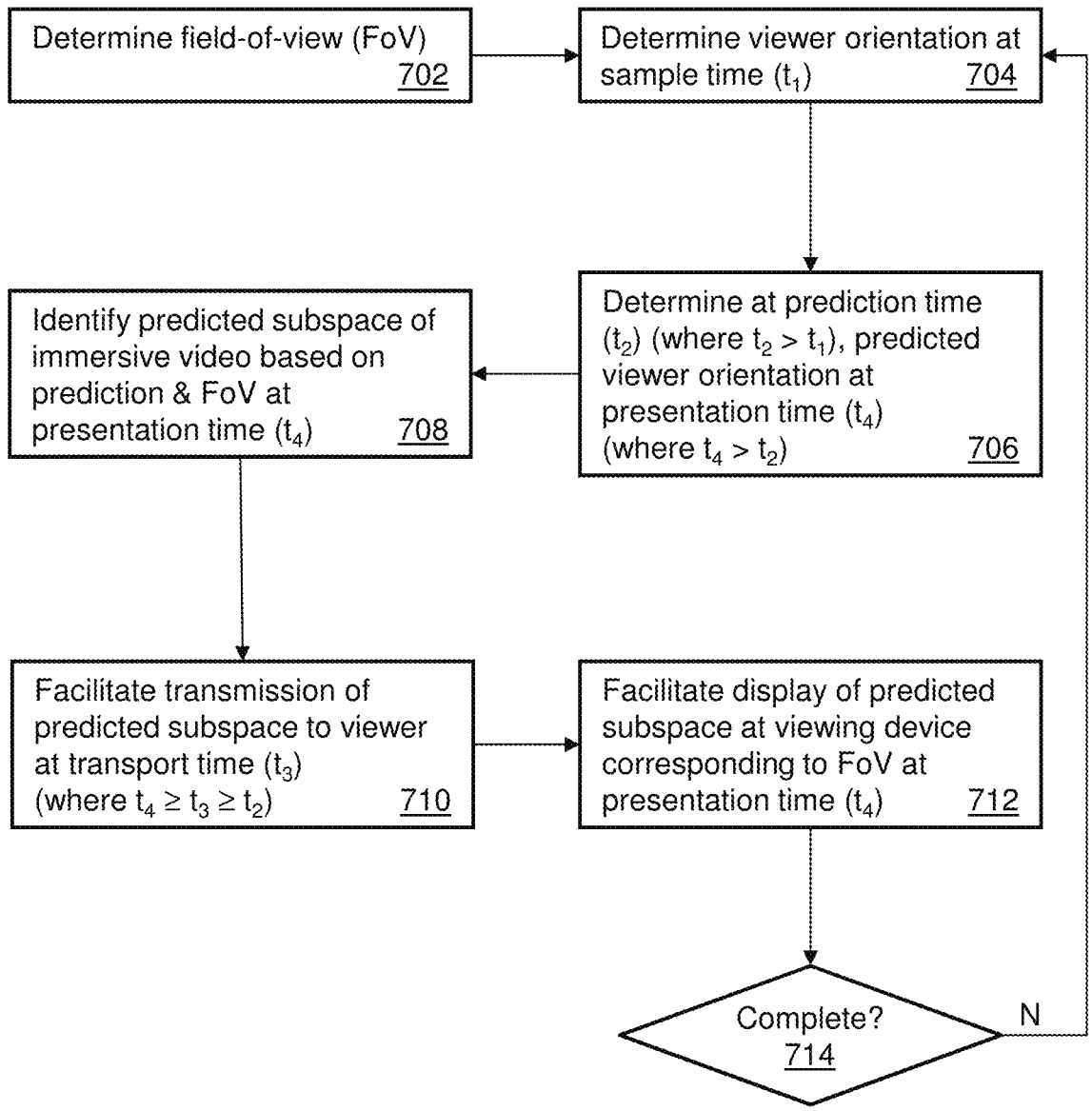
FIG. 7A depicts an illustrative embodiment of a method used in portions of the system described in FIGS. 1, 2 and 4.
Figure 7B:
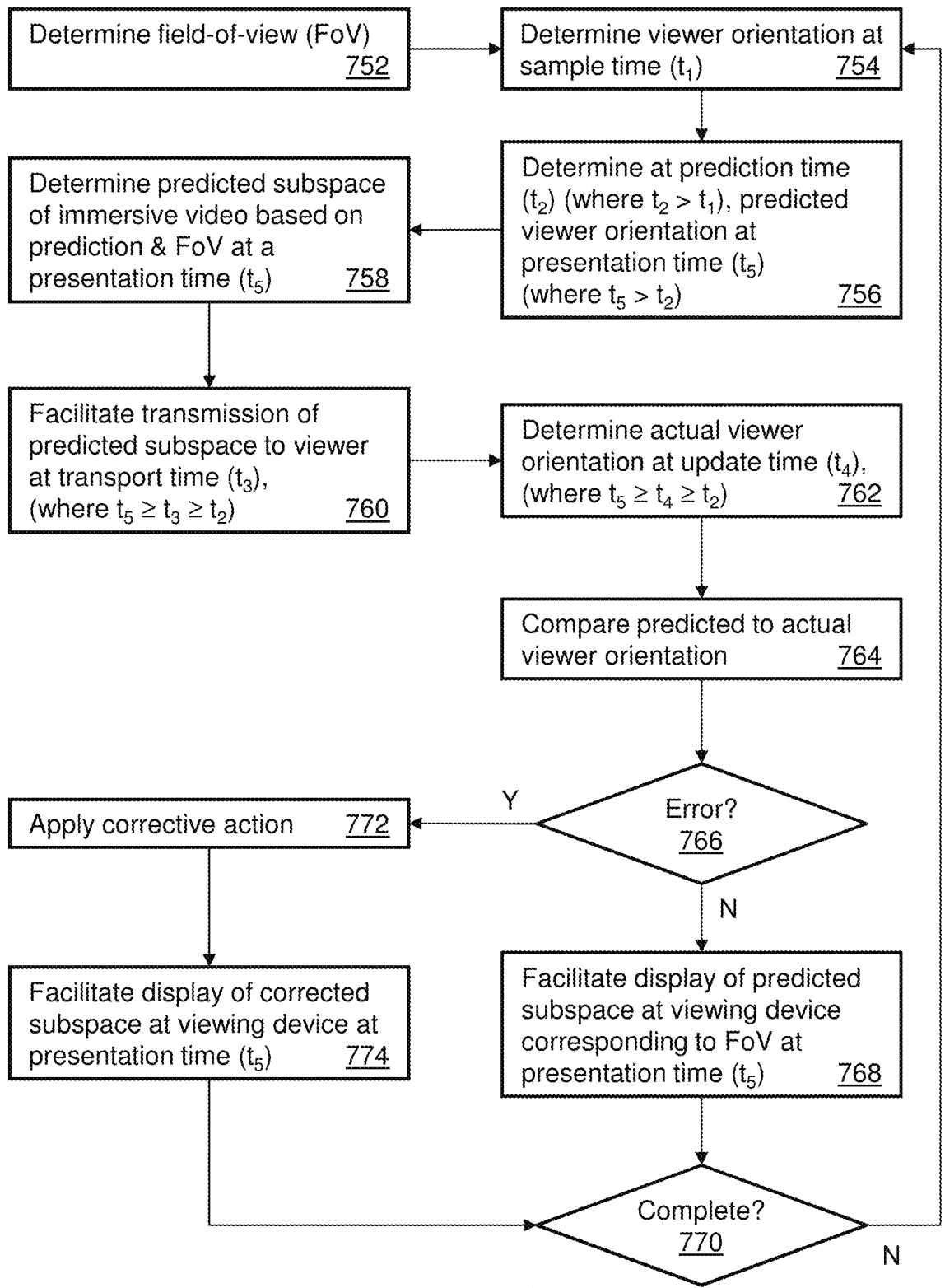
FIG. 7B depicts an illustrative embodiment of an alternative method used in portions of the system described in FIGS. 1, 2 and 4.

While for purposes of simplicity of explanation, the respective processes are shown and described as series of blocks in FIGS. 7A and 7B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 7A discloses a process 700 for reducing bandwidth requirements of a network exchange between a video source and an immersive viewing device. At step 702, a FoV of a particular viewer is determined and/or estimated. The field-of-view can be based on one or more parameters, such as a make and/or model of the headset, e.g., having an associated specified or design value, a resolution and/or size of a display of the headset, a resolution and/or size of the immersive video frame of the immersive video content item, a format of the immersive content item, e.g., 360, 180, ultra-wide screen, and the like.

A position and/or orientation of the viewer, or at least a display surface or region presented by the viewer, is determined at a first time, e.g., a sample time, $t_1$ at 704. The position and/or orientation can be based on position and/or orientation data obtained from the immersive video viewer, e.g., by position and/or inertial sensors and/or by external devices or sensors physically separate from the headset. In some embodiments, the position and/or orientation includes one or more of pitch, yaw or roll values. Alternatively or in addition, the position and/or orientation can include an azimuth and elevation, and the like.

An estimate of a position and/or orientation of the viewer at a later time, e.g., at a prediction and/or request time, $t_2$ is determined at 706, where $t_2 > t_1$. The estimate can be obtained from a prediction, e.g., according to a prediction algorithm. Example prediction algorithms can be based at least in part on prior samples of actual positions/orientations of the viewer at earlier times. In at least some embodiments, one or more samples of positions/orientations of a viewer's orientation/position are obtained over a sample interval. Without limitation, the sample interval includes a time period "T" preceding the prediction and/or request time $t_2$. The time period T can be a fixed time period, e.g., a sliding 1-second time interval that immediately precedes a prediction and/or request time $t_2$. Alternatively or in addition, the time period T can be variable. Variability can be based on one or more of past performance, network conditions, QoE, and the like. The illustrative examples disclosed herein include prediction algorithms that include computing one or more of an average, a linear regression and a weighted linear regression based on position samples e.g., some number of samples N obtained at sample times $t_{1a}, t_{1b} \ldots t_{1N}$ during the sample period T preceding the later sample and/or request time, such as a preceding T=1 second interval, e.g., $t_2$−T. The predictions for a position and/or orientation at a future presentation time, $t_4$, e.g., $t_4 > t_2$ are determined at the prediction time $t_2$, which may differ from a sample time by less than, equal to or greater than the duration of the preceding sample period or interval T.

A first subspace of an immersive video frame of the immersive video content item is determined at 708 based on the predicted orientation and the field-of-view at predicted to occur a future time, e.g., at the presentation time $t_4$. For example, a spherical space of a 360-degree immersive video frame can be mapped to a two-dimensional space, e.g., a planar frame 402 (FIG. 4). The planar frame 402 can be segmented, e.g., divided into sub segments or tiles 408. The viewable region 404 can be mapped onto the planar frame 402 to identify those sub segments or tiles 406 falling within or otherwise overlapped by the field-of-view 404.

Transmission of the predicted subspace, e.g., the overlapped tiles 406, of the immersive video frame 402 that are overlapped by the viewable region 404, to a display processor is facilitated at 710. Transmission or transport of the predicted subspace can occur at a transport time $t_3$, where $t_3 < t_4$. Display of the predicted subspace, e.g., at the transport time $t_4$, is facilitated at 712. To the extent that the actual viewer position and/or orientation substantially agree with the prediction, the display of the predicted subspace is coincident with the then current viewer position/orientation.

A determination is made at 714 as to whether the process 700 is complete. For example, if there remain immersive video frames in the immersive video media item, the process is not complete, and the process repeats from 704, processing subsequent immersive video frames. However, if the process 700 is complete, e.g., the last video frame of the immersive video media item has been processed, the process 700 may terminate.

In some embodiments, the predicted subspace 406 and the viewable region 404 are substantially the same. Alternatively or in addition, the predicted subspace, e.g., the overlapped tiles 406 and one or more other, e.g., neighboring tiles, is greater than the viewable region 404, wherein the viewable region 404 corresponds to the field-of-view if the immersive viewer. Accordingly, the predicted subspace allows for a large sub-portion of the entire immersive video frame 402 to be transferred. The differences in size can be based on errors, e.g., according to estimates and/or measurements, to allow at least some sub segments not falling within the field-of-view to be transferred to the display processor, while still offering a bandwidth advantage over transferring the entire immersive video frame.

The first subspace corresponding to the field-of-view is processed by the display processor a displayed at a display of the viewing devices at 710. If the process is not complete, e.g., there are more video frames to process, the process can repeat, e.g., returning to step 702 and repeating again and again for each immersive video frame. Each subsequent accounts for movement of a viewer's head by remapping the field-of-view to the subsequent immersive video frames based on an orientation of the headset at that time.

FIG. 7B discloses another process 750 for reducing bandwidth requirements of a network exchange between a video source and an immersive viewing device. At step 752, a FoV of a particular viewer is determined and/or estimated. The field-of-view can be based on one or more parameters, such as a make and/or model of the headset, e.g., having an associated specified or design value, a resolution and/or size of a display of the headset, a resolution and/or size of the immersive video frame of the immersive video content item, a format of the immersive content item, e.g., 360, 180, ultra-wide screen, and the like.

An actual position and/or orientation of the viewer, or at least a display surface or region presented by the viewer, is determined at a first, e.g., at a sample time $t_1$ at 754. The position and/or orientation can be based on position and/or orientation data obtained from the immersive video viewer, e.g., by position and/or inertial sensors and/or by external devices or sensors physically separate from the headset. In some embodiments, the position and/or orientation includes one or more of pitch, yaw or roll values. Alternatively or in addition, the position and/or orientation can include an azimuth and elevation, and the like.

An estimate of a position and/or orientation of the viewer at a later time, e.g., at a prediction and/or request time, $t_2$ is determined at 756, where $t_2 > t_1$. The estimate can be obtained from a prediction, e.g., according to a prediction algorithm. Example prediction algorithms can be based at least in part on prior samples of actual positions/orientations of the viewer at earlier times. In at least some embodiments, one or more samples of positions/orientations of a viewer's orientation/position are obtained over a sample interval. Without limitation, the sample interval includes a time period "T" preceding the prediction and/or request time $t_2$. The time period T can be a fixed time period, e.g., a sliding 1-second time interval that immediately precedes a prediction and/or request time $t_2$. Alternatively or in addition, the time period T can be variable. Variability can be based on one or more of past performance, network conditions, QoE, and the like. The illustrative examples disclosed herein include prediction algorithms that include computing one or more of an average, a linear regression and a weighted linear regression based on position samples e.g., some number of samples N obtained at sample times $t_{1a}, t_{1b} \ldots t_{1N}$ during the sample period T preceding the later sample and/or request time, such as a preceding T=1 second interval, e.g., $t_2$-T. The predictions for a position and/or orientation at a future presentation time $t_5$, e.g., $t_5 > t_2$ are determined at the prediction time $t_2$, which may differ from a sample time by less than, equal to or greater than the duration of the preceding sample period or interval T.

A first subspace of an immersive video frame of the immersive video content item is determined at 758 based on the predicted orientation and the field-of-view at predicted to occur a future time, e.g., at the presentation time $t_5$. For example, a spherical space of a 360-degree immersive video frame can be mapped to a two-dimensional space, e.g., a planar frame 402 (FIG. 4). The planar frame 402 can be segmented, e.g., divided into sub segments or tiles 408. The viewable region 404 can be mapped onto the planar frame 402 to identify those sub segments or tiles 406 falling within or otherwise overlapped by the field-of-view 404.

Transmission of the predicted subspace, e.g., the overlapped tiles 406, of the immersive video frame 402 that are overlapped by the viewable region 404, to a display processor is facilitated at 760. Transmission or transport of the predicted subspace can occur at a transport time $t_3$, where is $>t_3>t_2$. Preferably, the transmission process is completed by a reception time $t_3+\delta$, where $\delta$ corresponds to a transport time, and where $t_3+\delta \leq t_5$.

The actual viewer orientation is determined at an update time $t_4$ at 762. The actual viewer orientation can be determined according to any suitable technique, including the example techniques disclosed herein. At 764, the actual viewer orientation at the update time $t_4$ is compared to the predicted viewer orientation obtained at the prediction time $t_2$. An error is determined at 766 based on the comparison obtained at 764. An error can be determined if the comparison does not satisfy a predetermined criteria, e.g., resulting in a difference that exceeds a predetermined threshold. The difference can be determined according to one or more of angular difference, e.g., according to one or more of pitch, yaw and/or roll. Alternatively or in addition, the difference can be determined according to a difference between the predicted subspace determined at 758 and a subspace corresponding to the actual position/orientation of the viewer obtained at 762.

To the extent an error is not determined at 766, or that any error is within an acceptable limit, e.g., less than an error threshold, display of the predicted subspace at time $t_5$ is facilitated at 768. A determination is made at 770 as to whether the process 750 is complete. For example, if there remain immersive video frames in the immersive video media item, the process is not complete, and the process repeats from 754, processing subsequent immersive video frames. However, if the process 750 is complete, e.g., the last video frame of the immersive video media item has been processed, the process 750 may terminate.

To the extent an error is determined at 766, e.g., that an error exceeds an error threshold or acceptable range or tolerance, corrective action can be applied at 772 to obtain a corrected subspace in a timely manner to facilitate presentation of the corrected subspace at the presentation time $t_5$. Corrective actions can include any of the example corrective actions disclosed herein, such as transferring OOS tiles. Display of the corrected subspace at time $t_5$ is facilitated at 774.

By way of illustrative example, a FoV is first predicted at prediction time $t_2$, which corresponds to about 1 second before a presentation time $t_5$, i.e., $t_2 = t_5 - 1$ sec. The prediction is based on the presentation time $t_5$. The tile(s) corresponding to the FoV at a predicted position/orientation are requested for delivery over a mobile network at a request time $t_3$. A subsequent prediction for the FoV at the same presentation time $t_5$ is obtained at an update time $t_4$, which is after the request time $t_3$, but before presentation time $t_5$. For example, the update time $t_4=t_5-0.5$ sec (the prediction for a smaller window, e.g., 0.5 sec, is usually more accurate than that for a larger one, e.g., 1 sec). The updated prediction can be compared to the original prediction to determine whether the previous prediction is acceptable, e.g., valid.

To the extent the original prediction obtained based on a prediction at time $t_2$ remains valid or within an acceptable limit or tolerance, the originally requested tiles are presented at presentation time $t_5$. However, to the extent the previous prediction is no longer valid at time $t_4$, e.g., based on the updated prediction, than an adjustment can be made to the requested tile(s). In some embodiments, according to the corrective action at 772, a new request is made for the updated FoV. Alternatively or in addition, at 772, a further comparison is made between those tile(s) originally requested based on prediction time $t_2$, and the updated tiles determined based on subsequent prediction time $t_4$. A subsequent request can be made at 772 based on the difference, e.g., requesting a second transmission of extra tiles not originally requested at time $t_3$. At 774, presentation at time $t_5$ can be based on a combination of tiles obtained from the original request at time $t_3$ and those obtained based on a subsequent prediction at time $t_4$.

A determination is made at 770 as to whether the process 750 is complete. For example, if there remain immersive video frames in the immersive video media item, the process is not complete, and the process repeats from 754, processing subsequent immersive video frames. However, if the process 750 is complete, e.g., the last video frame of the immersive video media item has been processed, the process 750 may terminate.

Figure 8:
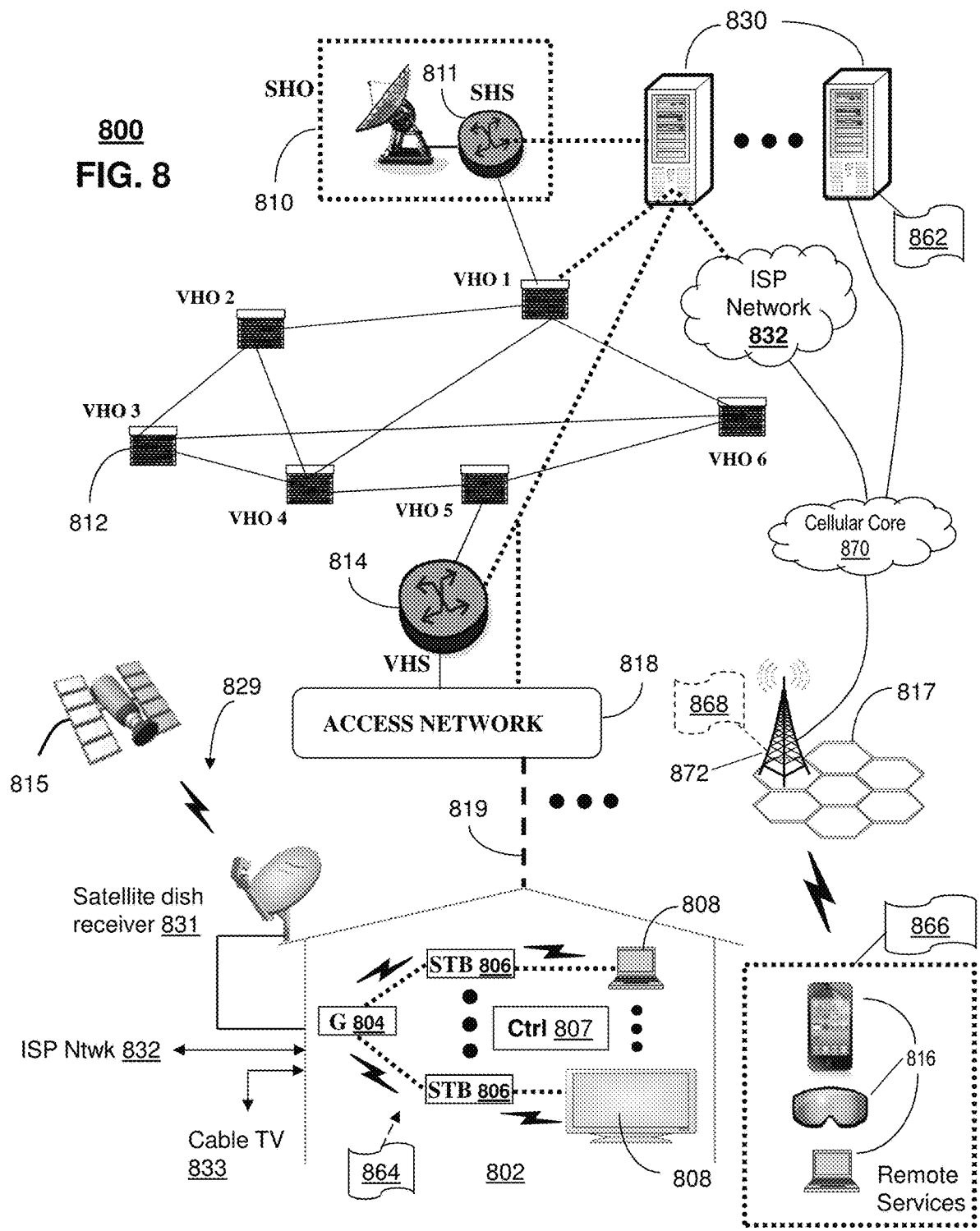
FIGS. 8-9 depict illustrative embodiments of communication systems that provide media services.

FIG. 8 depicts an illustrative embodiment of a communication system 800 for providing various communication services, such as delivering media content. The communication system 800 can represent an interactive media network, such as an interactive television system (e.g., an Internet Protocol Television (IPTV) media system). Communication system 800 can be overlaid or operably coupled with the video viewing device 200 of FIG. 2, as another representative embodiment of communication system 800. For instance, one or more devices illustrated in the communication system 800 of FIG. 8, detects an orientation of a viewing headset in reference to a viewing location, determines a field-of-view of the viewing headset, and identifies a first subspace of an entire immersive video frame of an immersive video content item based on the orientation and the field-of-view to facilitate transmission of the first subspace of the entire immersive video frame from the remote network location to a display processor for presentation at a viewing headset, without requiring transmission of the entire immersive video frame to the display processor.

In one or more embodiments, the communication system 800 can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol. The VHS 814 can distribute multimedia broadcast content via an access network 818 to commercial and/or residential buildings 802 housing a gateway 804 (such as a residential or commercial gateway).

The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a virtual reality (VR) processor (herein referred to as a VR processor 830). The VR processor 830 can use computing and communication technology to perform function 862, which can include among other things, the virtual reality processing techniques described by the processes 700, 750 of FIGS. 7A, 7B. For instance, function 862 of the VR processor 830 can be similar to the functions described for the immersive video server 102 of FIG. 1 in accordance with the processes 700, 750 of FIGS. 7A, 7B. The media processors 806 and wireless communication devices 816 can be provisioned with software functions 864 and 866, respectively, to utilize the services of the VR processor 830. For instance, functions 864 and 866 of media processors 806 and wireless communication devices 816 can be similar to the functions described for the immersive video client device 106 of FIG. 1 in accordance with processes 700, 750 of FIGS. 7A, 7B.

In at least some embodiments, the cellular network 817 includes a cellular core network 870 performing one or more core functions based on the applicable cellular protocols, e.g., 3GPP LTE, 5G, and the like. According to the illustrative embodiment, the cellular core network 870 can be in communication with the VR processor 830, e.g., via a network connection, such as an Internet connection. Alternatively or in addition, the VR processor 830 can be collocated with equipment of the cellular core network 870, e.g., at a common data center.

Although certain functions are disclosed at different locations in relation to the cellular network, it is understood that one or more of the various functions can be implemented at one or more different locations. For example, the immersive video client 106 can be implemented within a video player, and/or within a separate processor in local communication with the video player. With respect to the mobile wireless network 108, the foregoing locations would be at a UE portion of a wireless link. Likewise, the immersive video server 102 can be implemented within a server in communication with one or more of a mobile core network 870 and or a mobile base station, e.g., an eNB 872. For instance, functions 868 of the eNB 872 can be similar to the functions described for the immersive video server 102 of FIG. 1 in accordance with processes 700, 750 of FIGS. 7A, 7B.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
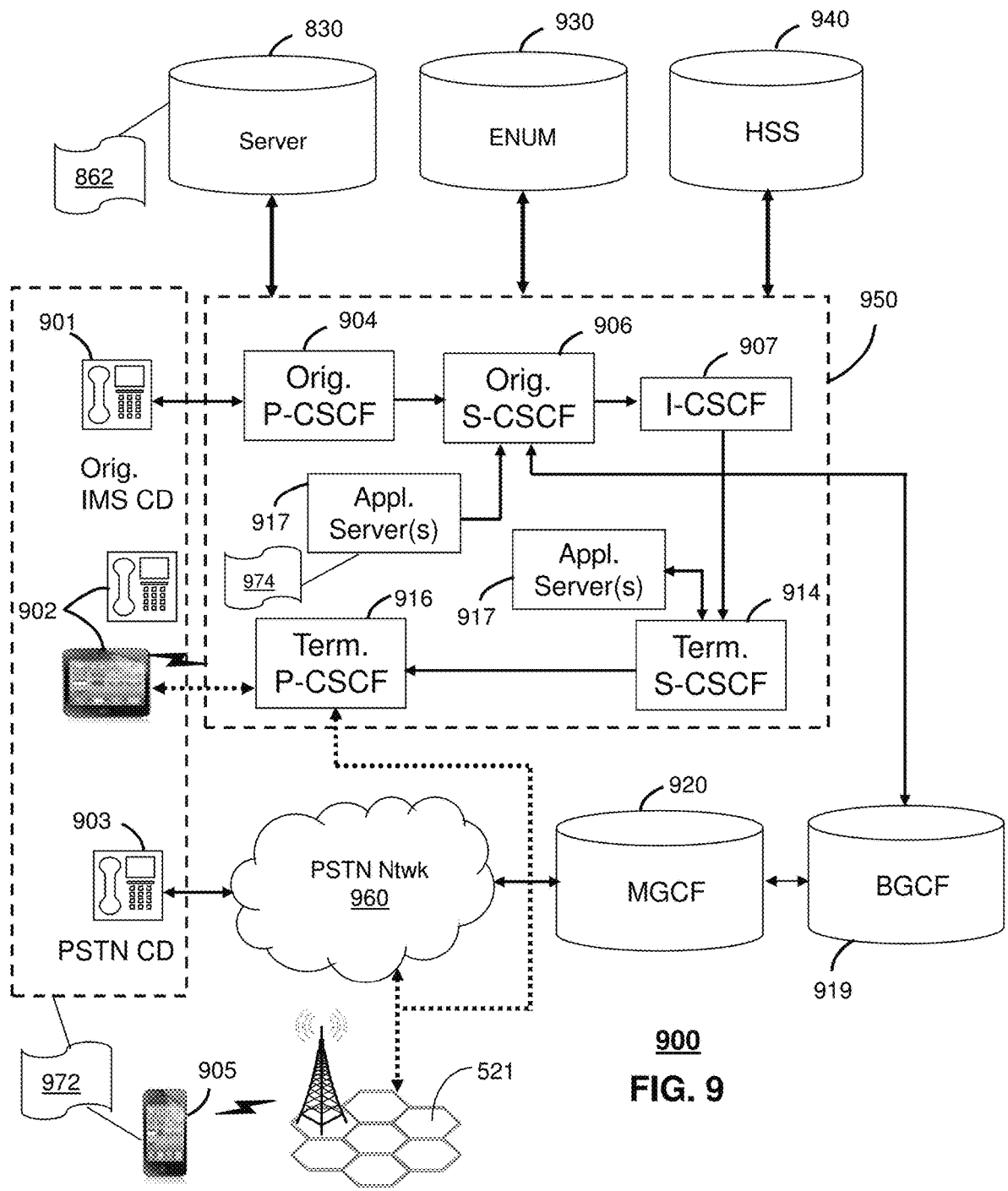

FIG. 9 depicts an illustrative embodiment of a communication system 900 employing an IP Multimedia Subsystem (IMS) network architecture to facilitate the combined services of circuit-switched and packet-switched systems. Communication system 900 can be overlaid or operably coupled with the viewing device 200 of FIG. 2 and communication system 800 as another representative embodiment of communication system 800. Elements of the communication system 800, alone or in combination with the viewing device 200 (FIG. 2), detects an orientation of a viewing headset in reference to a viewing location, determines a field-of-view of the viewing headset, and identifies a first subspace of an entire immersive video frame of an immersive video content item based on the orientation and the field-of-view to facilitate transmission of the first subspace of the entire immersive video frame from the remote network location to a display processor for presentation at a viewing headset, without requiring transmission of the entire immersive video frame to the display processor.

Communication system 900 can comprise a Home Subscriber Server (HSS) 940, a tElephone NUmber Mapping (ENUM) server 930, and other network elements of an IMS network 950. The IMS network 950 can establish communications between IMS-compliant communication devices (CDs) 901, 902, Public Switched Telephone Network (PSTN) CDs 903, 905, and combinations thereof by way of a Media Gateway Control Function (MGCF) 920 coupled to a PSTN network 960. The MGCF 920 need not be used when a communication session involves IMS CD to IMS CD communications. A communication session involving at least one PSTN CD may utilize the MGCF 920.

IMS CDs 901, 902 can register with the IMS network 950 by contacting a Proxy Call Session Control Function (P-CSCF) which communicates with an interrogating CSCF (I-CSCF), which in turn, communicates with a Serving CSCF (S-CSCF) to register the CDs with the HSS 940. To initiate a communication session between CDs, an originating IMS CD 901 can submit a Session Initiation Protocol (SIP INVITE) message to an originating P-CSCF 904 which communicates with a corresponding originating S-CSCF 906. The originating S-CSCF 906 can submit the SIP INVITE message to one or more application servers (ASs) 917 that can provide a variety of services to IMS subscribers.

For example, the application servers 917 can be used to perform originating call feature treatment functions on the calling party number received by the originating S-CSCF 906 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 906 can submit queries to the ENUM system 930 to translate an E.164 telephone number in the SIP INVITE message to a SIP Uniform Resource Identifier (URI) if the terminating communication device is IMS-compliant. The SIP URI can be used by an Interrogating CSCF (I-CSCF) 907 to submit a query to the HSS 940 to identify a terminating S-CSCF 914 associated with a terminating IMS CD such as reference 902. Once identified, the I-CSCF 907 can submit the SIP INVITE message to the terminating S-CSCF 914. The terminating S-CSCF 914 can then identify a terminating P-CSCF 916 associated with the terminating CD 902. The P-CSCF 916 may then signal the CD 902 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 9 may be interchangeable. It is further noted that communication system 900 can be adapted to support video conferencing. In addition, communication system 900 can be adapted to provide the IMS CDs 901, 902 with the multimedia and Internet services of communication system 800 of FIG. 8.

If the terminating communication device is instead a PSTN CD such as CD 903 or CD 905 (in instances where the cellular phone only supports circuit-switched voice communications), the ENUM system 930 can respond with an unsuccessful address resolution which can cause the originating S-CSCF 906 to forward the call to the MGCF 920 via a Breakout Gateway Control Function (BGCF) 919. The MGCF 920 can then initiate the call to the terminating PSTN CD over the PSTN network 960 to enable the calling and called parties to engage in voice and/or data communications.

It is further appreciated that the CDs of FIG. 9 can operate as wireline or wireless devices. For example, the CDs of FIG. 9 can be communicatively coupled to a cellular base station 921, a femtocell, a WiFi router, a Digital Enhanced Cordless Telecommunications (DECT) base unit, or another suitable wireless access unit to establish communications with the IMS network 950 of FIG. 9. The cellular access base station 921 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 9.

Cellular phones supporting LTE can support packet-switched voice and packet-switched data communications and thus may operate as IMS-compliant mobile devices. In this embodiment, the cellular base station 921 may communicate directly with the IMS network 950 as shown by the arrow connecting the cellular base station 921 and the P-CSCF 916.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The VR processor 830 of FIG. 8 can be operably coupled to communication system 900 for purposes similar to those described above. The VR processor 830 can perform function 862 and thereby provide virtual reality processing services to the CDs 901, 902, 903 and 905 of FIG. 9, e.g., similar to the functions described for the VR processor 830 of FIG. 8 in accordance with the processes 700, 750 of FIGS. 7A, 7B. CDs 901, 902, 903 and 905, which can be adapted with software to perform function 972 to utilize the services of the VR processor 830, e.g., similar to the functions described for the immersive video server 102 of FIG. 1 in accordance with the processes 700, 750 of FIGS. 7A, 7B. The VR processor 830 can be an integral part of the application server(s) 917 performing function 974, which can be substantially similar to function 862 and adapted to the operations of the IMS network 950.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 10:
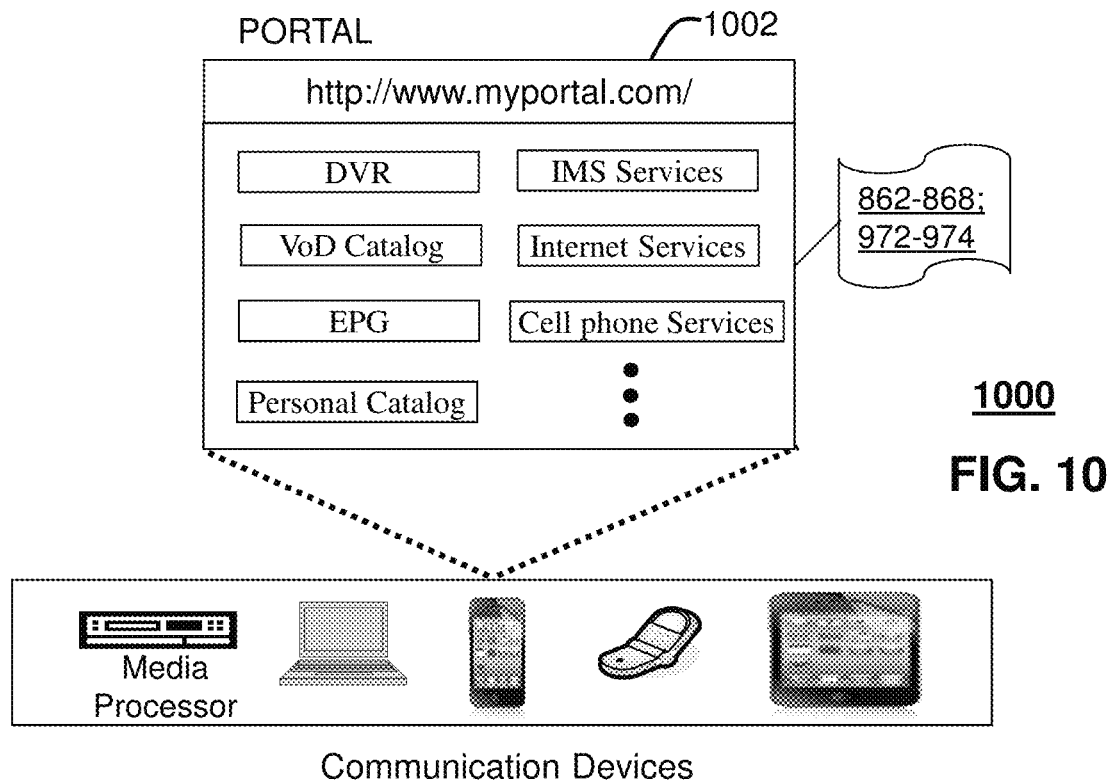
FIG. 10 depicts an illustrative embodiment of a web portal for interacting with the communication systems of FIGS. 8-9.

FIG. 10 depicts an illustrative embodiment of a web portal 1002 of a communication system 1000. Communication system 1000 can be overlaid or operably coupled with one or more of the immersive video server 102 and/or the immersive video client 106 in the system 100 of FIG. 1, and/or the viewing system 200 of FIG. 2, the communication system 800, and/or the communication system 900 as another representative embodiment of the immersive video server 102 and/or the immersive video client 106 in the system 100 of FIG. 1, and/or the viewing system 200 of FIG. 2, communication system 800, and/or communication system 900. The web portal 1002 can be used for managing services of the immersive video server 102 and/or the immersive video client 106 in the system 100 of FIG. 1, and/or the viewing system 200 of FIG. 2 and devices of communication systems 800-900, such as the VR processors 830. A web page of the web portal 1002 can be accessed by a Uniform Resource Locator (URL) with an Internet browser using an Internet-capable communication device such as those described in FIGS. 1-2 and FIGS. 8-9. The web portal 1002 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 1002 can also be used for provisioning IMS services described earlier, provisioning Internet services, provisioning cellular phone services, and so on.

The web portal 1002 can further be utilized to manage and provision software applications 862-866, and 972-974 to adapt these applications as may be desired by subscribers and/or service providers of the viewing system 100 of FIG. 1, and communication systems 800-900. For instance, users of the services provided by the viewing device 200 and/or the VR processor 830 can log into their on-line accounts and provision the systems 200 or processors 830 with information, e.g., such as user profiles, providing equipment identifications and/or descriptions, such as the viewing device, identification of video content item(s), video source(s), authentication and/or authorization information, contact information to server to enable it to communication with devices described in FIGS. 2-9, and so on. Service providers can log onto an administrator account to provision, monitor and/or maintain the immersive video server 102 and/or the immersive video client 106 in the system 100 of FIG. 1, and/or the viewing device 200 of FIG. 2 and/or the VR processor 830.

Figure 11:
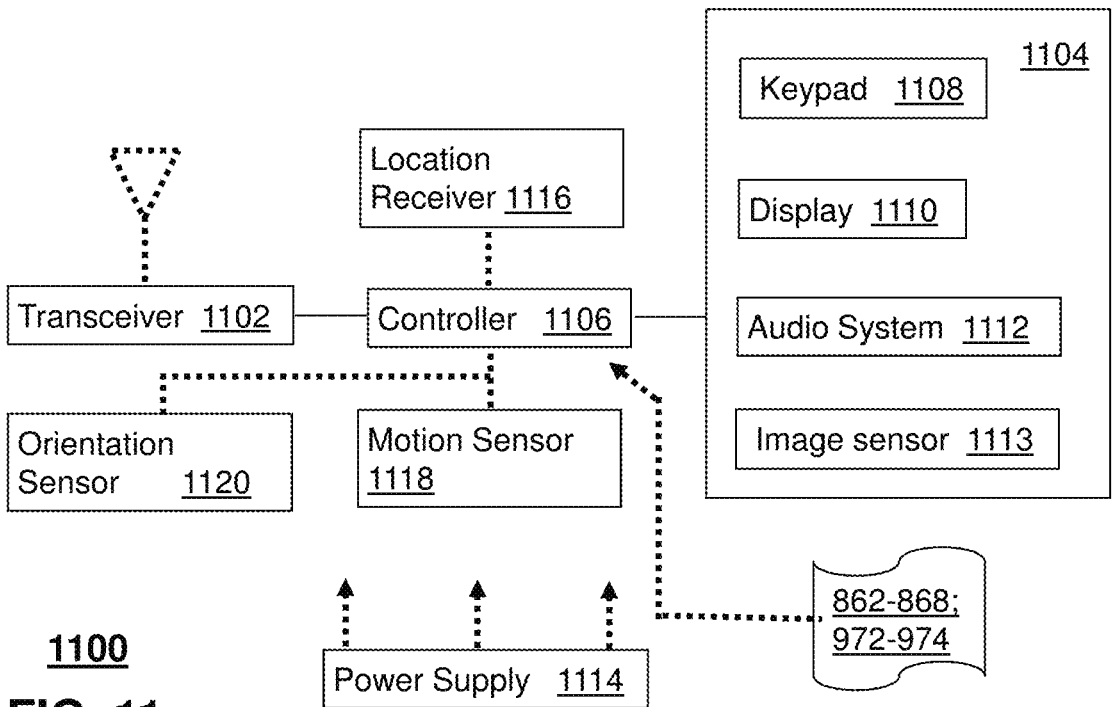
FIG. 11 depicts an illustrative embodiment of a communication device.

FIG. 11 depicts an illustrative embodiment of a communication device 1100. Communication device 1100 can serve in whole or in part as an illustrative embodiment of the devices 106, 110, 112, 200 depicted in FIGS. 1-2, and FIGS. 8-9 and can be configured to perform portions of the processes 700, 750 of FIGS. 7A, 7B.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize position and/or orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of the viewing device 200, the media processor 806, the media devices 808, or the portable communication devices 816 of FIG. 8, as well as the IMS CDs 901-902 and PSTN CDs 903-905 of FIG. 9. It will be appreciated that the communication device 800 can also represent other devices that can operate in the system 100 of FIG. 1, the VR processor 200 of FIG. 2, communication systems 800-900 of FIGS. 8-9 such as a gaming console and a media player. In addition, the controller 806 can be adapted in various embodiments to perform the functions 862-866 and 972-974, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
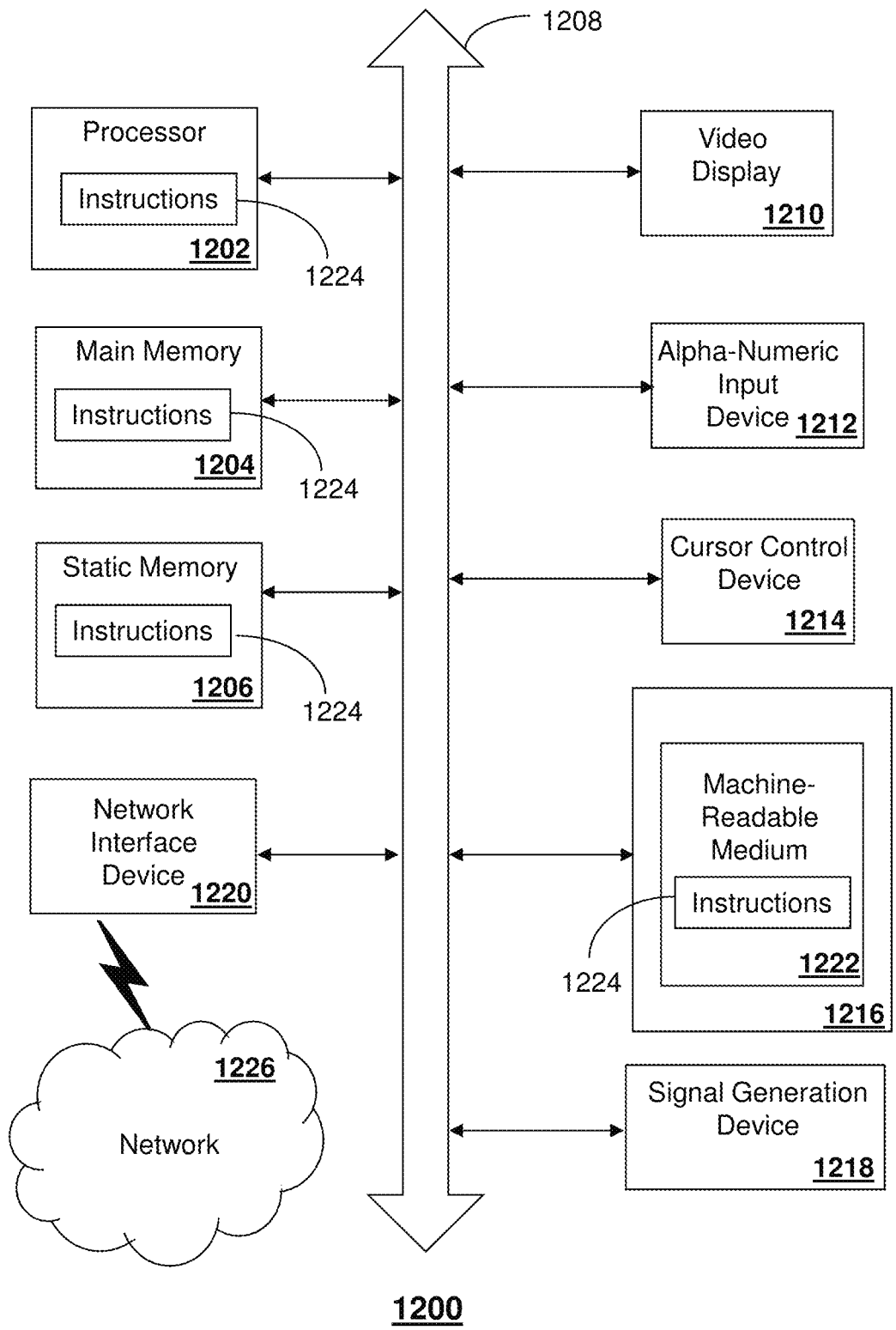
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the viewing device 200, the VR processor 830, the media processor 806 and other devices of FIGS. 1-2 and 8-11. In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1200. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   determining, by a processing system including a processor, a field-of-view of an immersive video viewer;
   determining, by the processing system, a present orientation of the immersive video viewer at a sample time;
   determining, by the processing system, a plurality of actual orientations of the immersive video viewer occurring at a plurality of times preceding the sample time;
   applying, by the processing system, a predictive algorithm based on one of an average, a linear regression, or a weighted linear regression of the plurality of actual orientations of the immersive video viewer;

predicting, by the processing system, a future orientation of the immersive video viewer to obtain a predicted orientation at a presentation time by the applying of the predictive algorithm, to obtain the predicted orientation of the immersive video viewer according to the present orientation of the immersive video viewer;

identifying, by the processing system, according to the predicted orientation of the immersive video viewer and the field-of-view, a spatial subsegment of an entire immersive video frame of an immersive video media item, corresponding to the presentation time;

facilitating, by the processing system, wireless transmission of the spatial subsegment of the entire immersive video frame toward the immersive video viewer for presentation at the immersive video viewer at the presentation time, without requiring transmission of the entire immersive video frame, the spatial subsegment comprising a field-of-view portion and an out-of-sight portion, wherein the out-of-sight portion that is being transmitted is at a lower quality than the field-of-view portion;

determining, by the processing system, an actual orientation of the immersive video viewer at the presentation time;

comparing, by the processing system, the actual orientation to the predicted orientation to obtain a comparison result;

determining, by the processing system, an error between the future orientation and the actual orientation based on the comparison result exceeding an error threshold;

determining, by the processing system and responsive to the comparison result exceeding the error threshold, a corrective action comprising adjusting a size of the spatial subsegment applied to processing of a subsequent immersive video frame;

determining, by the processing system, an updated position of the immersive video viewer at an update time after the sample time;

comparing, by the processing system, the updated position of the immersive video viewer at the update time to the predicted orientation of the immersive video viewer at the presentation time to obtain a comparison result;

determining an error based on the comparison result; and adjusting, by the processing system, the lower quality of the out-of-sight portion according to the error.

2. The method of claim 1, further comprising:
obtaining, by the processing system, another spatial subsegment of the entire immersive video frame corresponding to the presentation time, without requiring transmission of the entire immersive video frame; and
adjusting, by the processing system, the presentation at the immersive video viewer at the presentation time based on the another spatial subsegment of the entire immersive video frame.

3. The method of claim 1, further comprising:
facilitating, by the processing system, tracking of the error to obtain historical tracking performance; and
adjusting, by the processing system, the presentation at the immersive video viewer at the presentation time based on the historical tracking performance.

4. The method of claim 3, further comprising:
identifying, by the processing system, the immersive video media item, wherein the tracking of the error is associated with the immersive video media item.

5. The method of claim 1, further comprising:
statistically tracking, by the processing system, the error, wherein the determining of the present orientation of the immersive video viewer comprises determining one of a pitch, a yaw, a roll, or a combination thereof of the immersive video viewer.

6. The method of claim 1, wherein the entire immersive video frame comprises a 360 video frame of a 360 video content item.

7. The method of claim 1, wherein one of the present orientation of the immersive video viewer, the predicted orientation of the immersive video viewer, or both is based on a central location with respect to the entire immersive video frame.

8. The method of claim 1, wherein the facilitating of the transmission of the spatial subsegment of the entire immersive video frame further comprises facilitating, by the processing system, the transmission via a wireless network exchange.

9. The method of claim 8 wherein the wireless network exchange is according to a $3^{rd}$ Generation Partnership Project (3GPP) wireless network protocol.

10. The method of claim 1, further comprising:
facilitating, by the processing system, wireless transmission of another subsegment of the entire immersive video frame, without requiring transmission of the entire immersive video frame; and
determining, by the processing system, an error associated with the identifying of the spatial subsegment of the entire immersive video frame, wherein the presentation at the immersive video viewer is further based on the another subsegment of the entire immersive video frame.

11. The method of claim 1, further comprising:
facilitating, by the processing system, a request for the spatial subsegment of the entire immersive video frame corresponding to the presentation time, wherein the wireless transmission of the spatial subsegment of the entire immersive video frame to the immersive video viewer is responsive to the request.

12. The method of claim 11, wherein the entire immersive video frame comprises a spatial array of a plurality of tiles, and wherein the request comprises a request for the spatial subsegment comprises a request for multiple tiles of the plurality of tiles, wherein a spatial sub array of the multiple tiles corresponds to the spatial subsegment.

13. A non-transitory, machine-readable storage medium, comprising executable instructions that, when executed by a processing system including a processor, facilitate performance of operations, the operations comprising:
identifying an immersive video viewer comprising a field-of-view;
determining a present orientation of the immersive video viewer at a first time;
predicting a future orientation of the immersive video viewer to obtain a predicted orientation at a second time using a predictive algorithm, to obtain the predicted orientation of the immersive video viewer according to the present orientation of the immersive video viewer, wherein the predictive algorithm uses one of an average, a linear regression, or a weighted linear regression of a plurality of actual orientations of the immersive video viewer;
identifying according to the predicted orientation of the immersive video viewer and the field-of-view, a first spatial region of an immersive video frame corresponding to the second time, wherein the immersive video frame comprises the first spatial region and a second spatial region;

facilitating wireless transmission of the first spatial region of the immersive video frame to the immersive video viewer for presentation at the immersive video viewer at the second time, without requiring transmission of the second spatial region, the first spatial region comprising a field-of-view portion and an out-of-sight portion, wherein the out-of-sight portion that is being transmitted is at a lower quality than the field-of-view portion;

determining an actual orientation of the immersive video viewer at the second time;

comparing the actual orientation to the predicted orientation to obtain a comparison result;

determining an error between the future orientation and the actual orientation based on the comparison result exceeding an error threshold; and determining, responsive to the comparison result exceeding the error threshold, a corrective action comprising adjusting a size of the first spatial region applied to processing of a subsequent immersive video frame;

determining an updated orientation of the immersive video viewer at an update time after the first time;

comparing the updated orientation of the immersive video viewer at the update time to the predicted orientation of the immersive video viewer at the second time to obtain a comparison result;

determining an error based on the comparison result; and adjusting the lower quality of the out-of-sight portion according to the error.

14. The non-transitory, machine-readable storage medium of claim 13, wherein the determining of the present orientation of the immersive video viewer comprises determining one of a pitch, a yaw, a roll, or a combination thereof of the immersive video viewer.

15. The non-transitory, machine-readable storage medium of claim 13, wherein the facilitating of the wireless transmission of the first spatial region of the immersive video frame to the immersive video viewer for presentation at the immersive video viewer at the second time, without requiring the transmission of the second spatial region, further comprises facilitating the wireless transmission via a $3^{rd}$ Generation Partnership Project (3GPP) wireless network protocol.

16. A device, comprising:
a processing system including a processor; and
a memory that stores executable instructions that, when executed by the processing system, facilitate performance of operations, the operations comprising:
identifying a video viewer comprising a field-of-view;
determining a present orientation of a display region presented at a first time on a display of the video viewer;
determining a plurality of actual orientations of the video viewer occurring at a plurality of times preceding the first time;
predicting a future orientation of the display region occurring at a second time using a predictive algorithm, to obtain a predicted orientation of the display region to be presented at the second time on the display of the video viewer, wherein the predictive algorithm uses one of an average, a linear regression, or a weighted linear regression of the plurality of actual orientations of the video viewer;
identifying based on the predicted orientation of the display region and the field-of-view, a first spatial region of a video frame corresponding to the second time, wherein the video frame comprises the first spatial region and a second spatial region;
facilitating wireless transmission of the first spatial region of the video frame to the video viewer for presentation at the video viewer at the second time, without requiring transmission of the second spatial region, the first spatial region comprising a field-of-view portion and an out-of-sight portion, wherein the out-of-sight portion that is being transmitted is at a lower quality than the field-of-view portion;
determining an actual orientation of the video viewer at the second time;
comparing the actual orientation to the predicted orientation to obtain a comparison result;
determining an error between the future orientation and the actual orientation based on the comparison result exceeding an error threshold; and
determining, responsive to the comparison result exceeding the error threshold, a corrective action comprising adjusting a size of the first spatial region applied to processing of a subsequent immersive video frame;
determining an updated position of the video viewer at an update time after the first time;
comparing the updated position of the video viewer at the second time to the predicted orientation of the video viewer at the second time to obtain a comparison result;
determining an error based on the comparison result; and
adjusting the lower quality of the out-of-sight portion according to the error.

17. The device of claim 16, wherein the determining of the present orientation of the video viewer comprises determining one of a pitch, a yaw, a roll, or a combination thereof of the video viewer.

18. The device of claim 16, wherein the facilitating of the wireless transmission of the first spatial region of the video frame to the video viewer for presentation at the video viewer at the second time, without requiring the transmission of the second spatial region, further comprises facilitating the wireless transmission via a $3^{rd}$ Generation Partnership Project (3GPP) wireless network protocol.

19. The device of claim 17, wherein a change in roll in the future orientation of the display region occurring at the second time is constrained to less than fifteen degrees.

20. The device of claim 16, wherein the operations further comprise:
obtaining another spatial subsegment of the subsequent immersive video frame corresponding to the second time, without requiring transmission of the subsequent immersive video frame; and
adjusting, by the processing system, the presentation at the video viewer at the second time based on the another spatial subsegment of the subsequent immersive video frame.

* * * * *